US007308819B2

(12) United States Patent
Kamio et al.

(10) Patent No.: US 7,308,819 B2
(45) Date of Patent: Dec. 18, 2007

(54) GAS MEASURING METHOD INSIDE A SEALED CONTAINER

(75) Inventors: Masaru Kamio, Kanagawa (JP); Yasue Sato, Tokyo (JP); Kazuyuki Seino, Tokyo (JP); Hiromasa Mitani, Tokyo (JP)

(73) Assignees: Canon Kabushiki Kaisha, Tokyo (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/417,059

(22) Filed: May 4, 2006

(65) Prior Publication Data

US 2006/0208626 A1 Sep. 21, 2006

Related U.S. Application Data

(62) Division of application No. 10/682,960, filed on Oct. 14, 2003, now Pat. No. 7,108,573.

(30) Foreign Application Priority Data

Oct. 17, 2002 (JP) ............................ 2002-302758

(51) Int. Cl.
*G01M 3/00* (2006.01)
*G01M 3/04* (2006.01)

(52) U.S. Cl. ................................ 73/23.2; 73/52; 73/40

(58) Field of Classification Search ................. 73/23.2, 73/31.05, 52, 40
See application file for complete search history.

(56) References Cited

U.S. PATENT DOCUMENTS 3,592,049 A * 7/1971 Johanski, Jr. ................ 73/45.2
3,708,949 A * 1/1973 Wilcox .......................... 53/53
5,093,571 A 3/1992 Inomata et al. ............. 250/288
5,499,529 A * 3/1996 Kronberg et al. ............ 73/40.7
5,869,919 A 2/1999 Sato et al. ..................... 313/17
5,934,964 A 8/1999 Carella et al. ................ 445/25
5,939,619 A * 8/1999 Achter et al. ................ 73/40.7
5,952,775 A 9/1999 Sato et al. .................. 313/422
6,042,443 A 3/2000 Carella et al. ................ 445/24
6,050,133 A * 4/2000 Achter et al. ................ 73/40.7
6,114,694 A 9/2000 Ito ............................. 250/289
6,966,216 B2 * 11/2005 Hotta ......................... 73/49.3

FOREIGN PATENT DOCUMENTS

| | | |
|---|---|---|
| CN | 1136364 | 11/1996 |
| CN | 1303115 | 7/2001 |
| EP | 1 096 535 | 5/2001 |
| JP | 5-72015 | 3/1993 |
| JP | 7-226159 | 8/1995 |
| JP | 10-208641 | 8/1998 |
| JP | 10-269930 | 10/1998 |
| JP | 2952894 | 7/1999 |
| JP | 2000-76999 | 3/2000 |
| JP | 2000-340115 | 12/2000 |
| WO | WO 95/23425 | 8/1995 |

* cited by examiner

*Primary Examiner*—Hezron Williams
*Assistant Examiner*—Rodney Frank
(74) *Attorney, Agent, or Firm*—Fitzpatrick, Cella, Harper & Scinto

(57) ABSTRACT

A gas measuring method performs a gas measurement inside a sealed container provided with a pair of plates and an exhaust pipe having a breakable vacuum isolating member on at least one of the plates. The method includes the steps of connecting the sealed container to a gas measuring apparatus through the exhaust pipe, and breaking the breakable vacuum isolating member.

4 Claims, 9 Drawing Sheets

GAS MEASURING METHOD INSIDE A SEALED CONTAINER

This is a division of application Ser. No. 10/682,960, filed on Oct. 14, 2003 now U.S. Pat. No. 7,108,573.

BACKGROUND OF THE INVENTION

1. Field of the Invention

The present invention relates to a sealed container, a manufacturing method therefor, a gas measuring method, and a gas measuring apparatus for implementing the gas measuring method. More specifically, the invention relates to a sealed container used for a flat panel display, a manufacturing method for the sealed container, a gas measuring method used for measuring a gas rate of an emission gas, a leakage gas, or the like or measuring a life of a getter, and a gas measuring apparatus for implementing the gas measuring method.

2. Related Background Art

Examples of self-light emitting flat panel displays include a plasma display, an EL display device, and an image display device using an electron beam. An image display device using a sealed container that maintains its inside to a lower pressure than the atmospheric pressure is represented by a cathode ray tube (hereinafter, referred to as "CRT") of a television set, but devices and apparatuses including the plasma display and a flat panel display using an electron beam also utilize the sealed container that has a pair of plates and maintains its inside to a lower pressure than the atmospheric pressure. Currently, there are increasing demands for the display devices to have a larger screen and a higher definition, and there are ever-growing needs for the self-light emitting flat panel displays.

Such image display devices face a major problem of an image display life. This is because, while having a gas source that may be hit by electrons and ions, the image display device must maintain a high vacuum for as long as several tens of thousands of hours by limited exhaust means, making it necessary for electron radiation from an electron source to be conducted in a stable manner over a long period of time. The radioactivity of the electrons from the electron source is largely influenced by an emission gas inside the image display device. For example, the CRT may involve a problem of damage caused by Ar (JP 10-269930 A).

Accordingly, it is necessary to grasp types of gases causing damage to an electron source in an operation state and a gas generation rate (gas emission from a member) to reduce the damage to the electron source.

Further, in order to maintain a pressure inside a panel by the limited exhaust means, it is necessary to exhaust the emission gas emitted from the member. As the exhaust means, a barium getter is conventionally known, and almost all of its basic properties have become apparent. However, a gas absorbing power of the barium getter inside an actual panel is hard to estimate from the basic properties. This is because the absorbing power of a getter film largely differs according to a fine structure of the getter film inside the panel, the amount and type of the emission gas inside the panel (generation of a reaction product), and the like. Therefore, the absorbing power of a getter inside an actual panel can be only directly measured with respect to a subject panel.

Accordingly, as a method of measuring a life of an image display device, it is a problem of urgency to establish a method of measuring a life of a getter, in which an influence of a gas exerted to a device when an image is displayed is evaluated (an emission gas rate is accurately measured for each type of gas) while a vacuum state of the image display device is maintained.

On the other hand, known as a conventional gas measuring method is a method of measuring a gas partial pressure using a quadrupole mass spectrometer (Q-Mass) as a mass spectrometer for analyzing gases inside a vacuum apparatus and a process chamber (JP 2952894 B).

Proposed as a method of measuring an emission gas rate and an adsorption gas rate for each gas is a measuring method using a partial pressure gauge provided to each of two chambers that are connected to each other through an orifice (JP 05-072015 A). Also, for a CRT, plural methods of measuring an emission gas rate and an adsorption gas rate are proposed as the method of measuring a life of a getter. Examples of the proposed plural methods include: a method of heating a CRT to 150° C. to 250° C. and measuring an emission gas rate while cooling the CRT (JP 07-226159 A); a method of measuring a gas absorbing power of a getter film after the CRT is caused to run for a predetermined period of time, calculating an amount of an emission gas from a built-in member of the CRT, and estimating a long-term life of a getter based on the calculated amount (JP 10-208641 A); and a method of finding a relationship between an amount of a getter and a life of a CRT by setting the amount of the getter to a small amount (JP 2000-076999 A).

Further, JP 2000-340115 A discloses a manufacturing method for an image display device in which a manufacturing process is performed while a state of an atmosphere is being monitored by using an orifice having a known conductance and installed in part of an exhaust channel of a manufacturing apparatus for vacuum pumping.

According to the gas measuring methods disclosed in JP 2952894 B and JP 05-072015 A, a gas measurement is performed by placing a measurement sample inside a vacuum chamber and using a mass spectrometer, enabling the measurement for each type of gas. Particularly in JP 05-072015 A, a vacuum chamber having an orifice is used, enabling the measurement of an emission gas rate for each type of gas as well. However, it is difficult to place a large apparatus such as a flat panel display inside the vacuum chamber for the measurement. If the measuring apparatus is manufactured to be adapted for such a large apparatus, a huge manufacturing cost is required, making it hard to implement such arrangement.

The gas measurement for a CRT has long been performed. However, in JP 07-226159 A, a mass spectrometer is not used for the gas measurement, thereby making it impossible to measure an emission gas rate for each type of gas, and a gas to be adsorbed to a getter cannot be supplied, thereby making it impossible to accurately evaluate a life of a CRT. Further, in JP 10-208641 A, there are included an orifice and a total pressure gauge for measuring an emission gas rate, and a gas supply system for measuring a gas adsorbing power of a getter. However, a mass spectrometer is not used for a partial pressure measurement, thereby making it impossible to measure an emission gas rate for each type of gas. Also, it is possible to supply to the CRT a gas to be adsorbed to a getter through the orifice at a constant rate. However, lack of a chamber for adjustment of a pressure makes it difficult to adjust a pressure of the supplied gas, resulting in a long-time measurement. Further, according to the method of JP 2000-076999 A, which serves to measure the relationship between an amount of a getter and a life of a CRT by setting the amount of the getter to a small amount, the measurement requires a long period of time, and the gas measurement cannot be performed for a type of gas that is actually generated in the CRT. Therefore, it is difficult to accurately predict the life of the CRT.

The manufacturing method for an image display device disclosed in JP 2000-340115 A is suitable for a gas measuring method during the manufacturing, but is difficult to use as a gas measuring method for an image display device that has become a vacuum container.

Alternatively, as the gas measuring method for a CRT that has been manufactured, there is a method in which a hole is opened by a punch when a pipe for a measurement is connected to a funnel of the CRT.

However, according to this method, in the case of an apparatus using a thin glass plate such as a flat panel display, a crack easily develops, increasing the possibility of generating a leak.

SUMMARY OF THE INVENTION

The present invention therefore has been made in view of the above problems, and therefore has an object to provide a sealed container, a manufacturing method for the sealed container, a gas measuring method, and a gas measuring apparatus which are capable of performing various evaluations more accurately than conventional arts based on a gas measurement.

Therefore, according to a gist of the present invention, there is provided a sealed container which is capable of maintaining an inside thereof to a lower pressure than an atmospheric pressure, and is used for an image display device including in the inside: a phosphor; electron-emitting means for causing the phosphor to emit light; and a getter, the sealed container including an exhaust pipe having a breakable vacuum isolating member on at least one side of the sealed container.

Further, according to another gist of the present invention, there is provided a manufacturing method for a sealed container used for an image display device, including:

manufacturing plural sealed containers by preparing plural first plates; preparing plural second plates; and seal-bonding a pair of plates composed of the first plate and the second plate such that an inside of the sealed container is maintained to a lower pressure than an atmospheric pressure;

manufacturing at least one of the plural sealed containers as a sealed container for measurement provided with an exhaust pipe having a breakable vacuum isolating member; and performing a gas measurement inside the sealed container for measurement by breaking the breakable vacuum isolating member of the sealed container for measurement.

Here, in the manufacturing method for a sealed container according to the present invention, the exhaust pipe is preferably connected to the plate through bellows.

Further, the breakable vacuum isolating member is preferably formed of at least one selected from the group consisting of a metal, an alloy, a metallic compound, and glass, which have a thickness enough to be kept from being broken merely due to a differential pressure between the inside and an outside of the sealed container.

Further, preferably, after the exhaust pipe is connected to a gas measuring apparatus, the gas measuring apparatus is vacuum-exhausted, the breakable vacuum isolating member is broken, and the gas measurement is performed by using a measuring chamber having an orifice having a predetermined conductance and installed in part of an exhaust channel of the gas measuring apparatus.

Further, assuming that: a gas partial pressure inside a space on a sealed container side in the measuring chamber separated by the orifice is $P_1$; a gas partial pressure inside a space on an exhausting side is $P_2$; a conductance of the orifice is $C_1$; an emission gas rate on a background is $Q_0$; and a current value at a time of displaying an image is Ie, an emission gas rate R per unit current value of each gas inside the sealed container is preferably calculated from the following formula (1).

$$R=(C_1(P_1-P_2)-Q_0)/I_e \tag{1}$$

Further, preferably, from a cracking pattern of two or more types of gases including CO and $N_2$ and a current intensity of an ion current peak of the gases having the same mass number as that of the gases, a partial pressure of the gases is obtained to obtain the emission gas rates R of CO and $N_2$, respectively.

Further, preferably, after the exhaust pipe is connected to a gas measuring apparatus, the gas measuring apparatus is exhausted, the breakable vacuum isolating member is broken, and the gas is supplied by using a gas chamber having an orifice having a predetermined conductance and installed in part of an exhaust channel of the gas measuring apparatus.

Further, assuming that: a pressure in a space on a sealed container side in the gas chamber having the orifice is $P_3$; a pressure in a space on an exhausting side is $P_4$; a conductance of the orifice for supplying the gas is $C_2$; a time to, after introducing the gas by closing a valve in the space on the exhausting side in the gas chamber, close a valve in the space on the sealed container side is 0; and a time required until the pressure $P_3$ and the pressure $P_4$ become the same is T, a total gas amount W adsorbed to the getter is preferably calculated by the following formula (2).

$$W=\int_0^T C_2(P_4-P_3)\,dt \tag{2}$$

In addition, preferably, a region to which the getter is not formed is provided to part of the plate including the getter;

a gas rate $R_1$ of a getter adsorption gas at a time of initially displaying an image in the region and a gas rate R of the getter adsorption gas after a time t elapses are calculated from the formula (1);

a gas rate attenuation index κ of the getter adsorption gas is obtained from the following formula (3);

a total gas amount W adsorbed is calculated from the formula (2); and a getter lifetime $T_{end}$ is calculated from the following formula (4).

$$R=(C_1(P_1-P_2)-Q_0)/I_e \tag{1}$$

$$W=\int_0^T C_2(P_4-P_3)\,dt \tag{2}$$

$$R=R_1 t^K \tag{3}$$

$$T_{end}\equiv\left(\frac{(1+\kappa)}{R_1}\times W\right)^{\frac{1}{1+\kappa}} \tag{4}$$

Further, it is preferable to, after introducing the gas into the sealed container, measure a change amount of the current value Ie with respect to a display time at the time of displaying an image.

It is also preferable to use a member whose forward end is incisive for breaking the breakable vacuum isolating member.

That the exhaust pipe is preferably installed on a lower side of an image display surface and the breakable vacuum isolating member is broken.

Further, according to another gist of the present invention, there is provided a gas measuring method, including performing a gas measurement inside a sealed container provided with a pair of plates and an exhaust pipe having a breakable vacuum isolating member on at least one of the plates, by connecting the sealed container to a gas measuring apparatus through the exhaust pipe, and breaking the breakable vacuum isolating member.

Here, while the exhaust pipe is preferably installed to be directed downward, the breakable vacuum isolating member is broken.

Further, according to still another gist of the present invention, there is provided a gas measuring apparatus for implementing the gas measuring method according to the gist of the present invention.

Here, the gas measuring apparatus according to the present invention preferably includes:

a first gas measuring means including a measuring chamber in which a small hole of a conductance is formed as an orifice in a portion between the sealed container and a main vacuum pump, and at least pressure measuring means are installed on an upstream side and a downstream side of the small hole;

a second gas measuring means including a gas chamber in which a small hole of a conductance is formed as an orifice in a portion between the sealed container and a vacuum pump, and at least pressure measuring means are installed on an upstream side and a downstream side of the small hole, and which is provided with gas supplying means from the downstream side;

a breaking member that has a forward end for breaking the breakable vacuum isolating member; and a luminance meter to measure a luminance at a time of driving the sealed container.

Further, according the present invention, there is provided a sealed container, which is used for an image display device, is manufactured by the manufacturing method for a sealed container according to the gist of the present invention, and does not include the exhaust pipe.

According to embodiments described later, the container to be subjected to a gas measurement described later is seal-bonded in a vacuum in a state where the exhaust pipe having the breakable vacuum isolating member is connected to the container at the time of manufacturing the container. Accordingly, it becomes possible to perform the gas measurement for the emission gas rate or the like while maintaining the depressurized state inside the container.

Further, if the exhaust pipe is installed on the side of the plate to which the phosphor and the getter are formed, the measurement can be performed without influencing the electron emission.

Further, if the exhaust pipe having the vacuum isolating member is previously provided to the plate, the degasification can be sufficiently performed on the container, the degasification from the member composing the container can be suppressed to a minimum, and the emission gas rate at the time of displaying an image can be accurately measured.

Further, there is no trouble such as a leak or a damage which occurs when the sealed container is formed with a hole later and attached with the exhaust pipe for measurement. In addition, if the isolating member is broken while the exhaust pipe is directed downward, fragments generated at that time are kept from being scattered inside the image display device, thereby suppressing discharge due to the fragments of glass when displaying an image.

Further, if the exhaust pipe has the bellows on the side to be connected to the plate, the exhaust pipe can be bent, facilitating the handling at the steps following the attaching of the exhaust pipe. In addition, after attaching the exhaust pipe having the breakable vacuum isolating member to the gas measuring apparatus, the bellows can absorb a thermal strain, a mechanical impact force, or the like, thereby preventing the exhaust pipe from being damaged.

If the breakable vacuum isolating member is a film formed of a metal, an alloy, a metallic compound, or glass which has a thickness enough to be kept from being broken due to the atmospheric pressure, the container can be manufactured while maintaining a vacuum. When performing the gas measurement, by using the breakable member whose forward end is incisive, the isolating member can be easily broken, and it becomes possible to perform the gas measurement on the container.

If the total pressure before and after the orifice having a known conductance and provided to the measuring chamber or the partial pressure of each type of gas is measured, the conductance value of the orifice can be used to quantitatively evaluate the emission gas rate of each type of gas at the time of image display. In addition, if the emission gas rate is measured as the emission gas rate per unit current value, the emission gas rate can be quantitatively evaluated as the emission gas rate that is not influenced by the level of the current amount for electron radiation from the electron source. If the emission gas rate is measured when the entire image area is not displayed but partial area is displayed, the emission gas rate at the time of displaying the entire image area can be predicted.

Also, in the case of measuring the partial pressure of each type of gas, the mass spectrometers are respectively provided to the two measuring chambers divided by the orifice. Therefore, the emission gas rates of the types of gases having the same molecular weight (mass number) such as CO and $N_2$ can be easily separated by solving the simultaneous equations based on a relational expression between the pressure and a peak intensity by use of a cracking pattern. Thus, the emission gas rate of each type of gas can be measured. Accordingly, if the emission gas rate is measured in one container, the emission gas rate in another container can be easily predicted.

Further, the emission gas rate of each type of gas can be accurately grasped. Accordingly, the attenuation index of the adsorption gas rate of the getter adsorption gas used for the measurement of the getter lifetime described later can be accurately calculated.

If the total pressure before and after the orifice having a known conductance and provided to the gas chamber is measured, the conductance value of the orifice can be used to quantitatively evaluate the gas rate of the introduced gas.

Further, by introducing the getter adsorption gas from the gas chamber, a constant amount of gas can be supplied to the container at a fixed rate. Accordingly, the total adsorption gas amount of the getter can be quantitatively evaluated with high precision.

Further, if each type of gas is introduced in a constant amount at a fixed rate, an arbitrary gas is introduced to display an image, thereby making it possible to accurately evaluate the influences of the type of gas on the electron-emitting characteristics of the electron source.

If the region to which the getter is not formed is provided to part of the plate including the phosphor and the getter, by measuring the emission gas rate of the getter adsorption gas in the region to which the getter is not formed at the time of displaying an image in the region for a short period of time, the attenuation index of the emission gas rate of the getter adsorption gas can be obtained. Next, by measuring the total adsorption gas amount of the getter due to introduction of the getter adsorption gas, the relational expression between the attenuation index of the emission gas rate of the getter adsorption gas and the total adsorption gas amount of the getter is solved. Accordingly, the getter lifetime can be easily calculated, and the life of the sealed container for the image display device can be easily predicted with high precision for a short period of time.

Further, if barium or a barium alloy is used as the getter and CO is used as the getter adsorption gas, the getter lifetime inside the container can be measured with high precision, and the life of the sealed container for the image display device can be accurately predicted.

DESCRIPTION OF THE PREFERRED EMBODIMENTS

Hereinafter, detailed description will be made of preferred embodiments with reference to the drawings.

Figure 1:
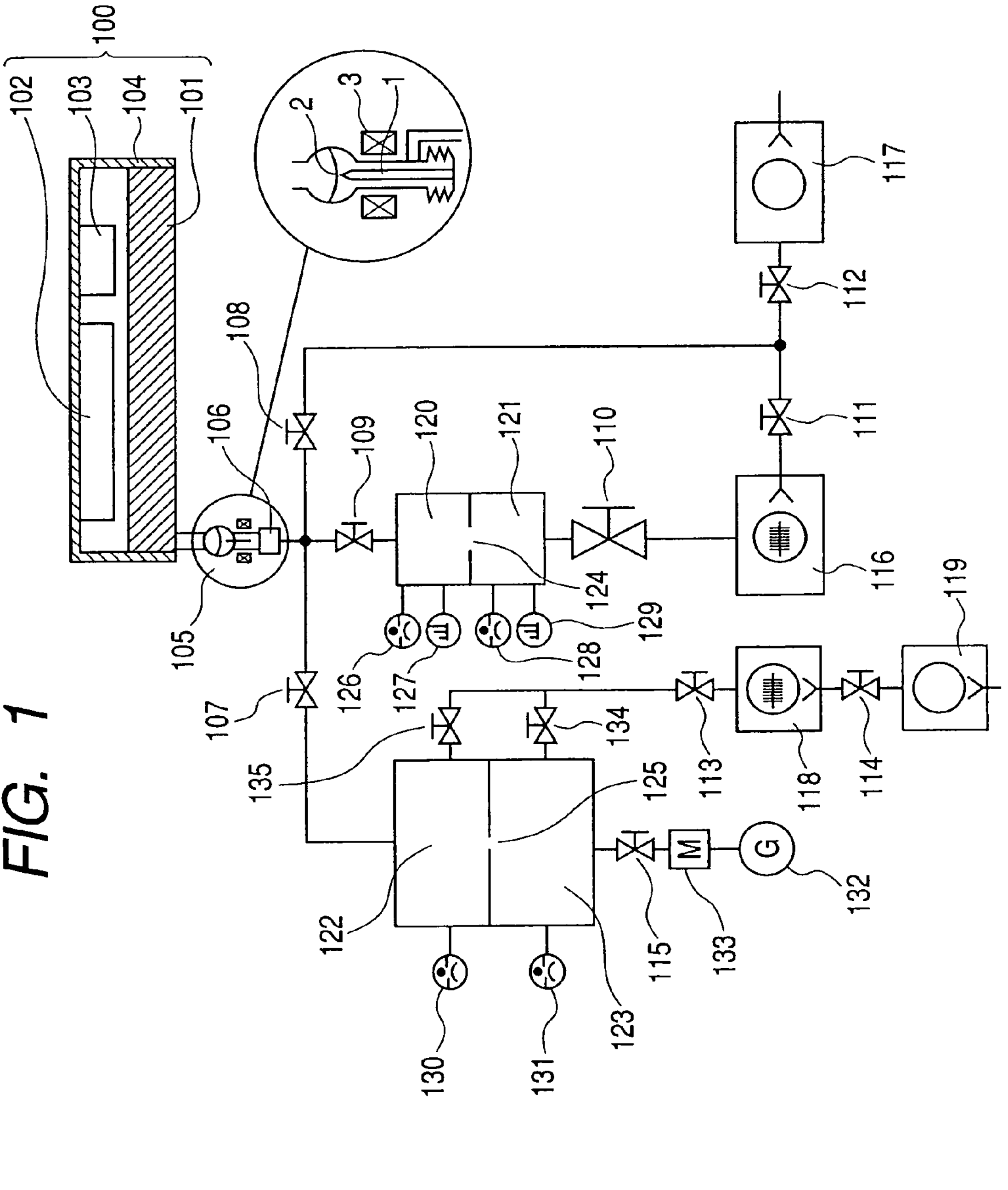
FIG. 1 is a diagram for explaining a gas measurement for an image display device according to the present invention.

FIG. 1 is a schematic diagram showing an image display device and part of a measuring apparatus for performing a gas measurement according to the present invention. In FIG. 1, an image display panel 101 having a flat shape includes an electron source for generating an electron beam, a phosphor, and a getter in a vacuum envelope surrounded by a face plate, a rear plate, and a supporting frame, and further includes at least an exhaust pipe 105 that has a breakable seal (vacuum isolating member) and serves to vacuum-exhaust the envelope. A voltage applying device 102 applies a voltage to the image display panel 101 to drive the image display panel 101; a high-voltage applying device 103 applies a high voltage to the image display panel 101; and an external frame 104 serves to receive the voltage applying device 102, the high-voltage applying device 103, and the image display panel 101. The voltage applying device 102, the high-voltage applying device 103, and the image display panel 101 are connected to each other through cables (not shown) to compose an image display device 100. Here, the image display panel 101 is capable of applying a surface conduction electron-emitting device or the like to the electron source, and there are no particular limitations on its form. Note that in this embodiment, devices used for displaying an image are received inside the external frame 104 that is formed integrally with the image display panel 101. However, the devices may also be installed in a position slightly apart from the image display panel 101 through cables or the like. Further, as the vacuum isolating member, it is possible to use glass, a metal, an alloy of metals, ceramics, or the like. This embodiment shows an example of using the vacuum isolating member made of glass as the exhaust pipe made of glass.

A structure for performing a gas rate measurement for each type of gas includes: an orifice 124; a first measuring chamber 120 located on an upstream side of the orifice 124 toward an image display panel 101 side; a second measuring chamber 121 located on a downstream side of the orifice 124 opposite the image display panel 101 side; a first ionization vacuum gauge 126 for measuring a total pressure inside the first measuring chamber 120; a first mass spectrometer 127 for measuring a partial pressure of each type of gas inside the first measuring chamber 120; a second ionization vacuum gauge 128 for measuring a total pressure inside the second measuring chamber 121; a second mass spectrometer 129 for measuring a partial pressure of each type of gas inside the second measuring chamber 121; a turbo-molecular pump 116 serving as a main vacuum pump; a dry pump 117 serving as an auxiliary pump; valves 108 to 112 capable of causing airtightness; and an exhaust pipe adapter 106 capable of causing vacuum airtightness, which serves to connect the exhaust pipe 105 to a measuring apparatus.

A structure of a gas measuring system for performing introduction of a gas includes: an orifice 125; a first gas chamber 122 forming a space on the image display panel 101 side (upstream side); a second gas chamber 123 forming a space on the opposite side to the image display panel 101 side (downstream side); a third ionization vacuum gauge 130 for measuring a total pressure inside the first gas chamber 122; a fourth ionization vacuum gauge 131 for measuring a total pressure inside the second gas chamber 123; a gas bomb 132 containing a gas to be introduced; a mass flow controller 133 for controlling a gas flow rate of the gas bomb 132; a turbo-molecular pump 118 serving as a vacuum pump; a dry pump 119 serving as an auxiliary pump; and valves 107, 113 to 115, 134, and 135 capable of causing airtightness.

Here, as the ionization vacuum gauge, it is possible to use a hot cathode type, a cold cathode type, a B-A gauge, an extractor gauge, or the like. There are no particular limitations on the type of ionization vacuum gauge, and a device capable of measuring a required pressure may be used instead of the ionization vacuum gauge. In addition, as the mass spectrometer, it is preferable to use a quadrupole mass spectrometer. However, a magnetic field deflection type, an omegatron mass spectrometer, or the like can also be used.

There are no particular limitations on the type of mass spectrometer, and a device capable of measuring a partial pressure of a required pressure may be used instead of the mass spectrometer.

Next, description will be made of a gas measuring method of the present invention which is implemented by using the apparatus shown in FIG. 1. In advance, the valves 107 to 109 are closed, the valves 110 to 115, 134, and 135 are opened, the turbo-molecular pumps 116 and 118 and the dry pumps 117 and 119 are activated, and the spaces inside the first measuring chamber 120, the second measuring chamber 121, the first gas chamber 122, and the second gas chamber 123 are each vacuum-exhausted to a pressure equal to or less than approximately $10^{-5}$ Pa. Then, the valve 115 is closed. The exhaust pipe 105 of the image display panel 101 is connected to the exhaust pipe adapter 106. As a connection method for the exhaust pipe adapter 106 with respect to the exhaust pipe 105, it is possible to utilize an O-ring, glass welding, and adhesion through an adhesive such as an epoxy resin, and there are no particular limitations on the connection method as far as vacuum airtightness is maintained and the amount of an emission gas is kept small.

Firstly, description will be made of a first method of measuring an emission gas rate for each type of gas emitted from the image display panel 101. The valves 110 and 111 are closed and the valve 108 is opened to vacuum-exhaust a space before a breakable vacuum isolating member section of the exhaust pipe 105.

The valve 108 is then closed and the valves 109 to 111 are opened to perform vacuum exhaustion by the turbo-molecular pump 116. The first ionization vacuum gauge 126, the first mass spectrometer 127, the second ionization vacuum gauge 128, and the second mass spectrometer 129 are activated, and the measuring apparatus is heated. A heating temperature in this case can be selected as appropriate from a range up to approximately 250° C. due to heat resistance of vacuum parts. By heating the measuring apparatus and measuring devices, a gas measurement accuracy can be improved due to reduction in emission of a gas such as from moisture adhering (adsorbing) to a surface or the like of a constituent member inside the measuring apparatus. Thus, it is effective to heat the measuring apparatus after connecting a sealed container to an exhaust device.

After the temperature of the measuring apparatus is reduced to the room temperature, as shown in FIG. 1, a breaking member such as a metal rod 1 whose forward end is incisive is used from a measuring apparatus side to break the breakable vacuum isolating member 2, thereby exhausting the image display panel 101 while maintaining a vacuum atmosphere therein. Here, the metal rod 1 whose forward end is incisive is previously set on the measuring apparatus side, for example, inside a space provided to a lower portion of the exhaust pipe adapter 106. Thus, the breakable vacuum isolating member 2 can be broken by being punctured with the metal rod 1 whose forward end is incisive. It is possible to appropriately select a material of the breaking member from: at least one type of metal selected from the group consisting of Fe, Ni, Ti, Mo, Tn, etc.; an alloy containing metals selected from the above group; and the like. In addition, a hard substance such as diamond may be attached to the forward end of the metal rod 1. The present invention is not limited to the above-mentioned breaking method. It is also possible to break a breakable vacuum isolating member, for example, by controlling an iron ball from a magnet provided outside the exhaust pipe. Alternatively, a rod is attached to bellows provided to an exhaust adapter, and an isolating member may be broken by vertically moving the rod together with the bellows while maintaining an airtight state inside the exhaust adapter.

After the pressure is stabilized, the total pressure inside the first measuring chamber 120 and the total pressure inside the second measuring chamber 121 are measured by the first ionization vacuum gauge 126 and the second ionization vacuum gauge 128, respectively. At the same time, the partial pressure of each type of gas inside the first measuring chamber 120 and the partial pressure of each type of gas inside the second measuring chamber 121 are measured by the first mass spectrometer 127 and the second mass spectrometer 129, respectively.

Assuming that: a total emission gas rate (background) from the image display panel 101, the first measuring chamber 120, the second measuring chamber 121, the exhaust pipe 105, and the exhaust pipe adapter 106 is $Q_0$; a pressure inside the first measuring chamber 120 is $P_A$; a pressure inside the second measuring chamber 121 is $P_B$; and a conductance of the orifice 124 is $C_1$, when the pressure $P_A$ and the pressure $P_B$ show little change, the emission gas rate $Q_0$ (background) from the image display panel 101 and the measuring apparatus is obtained by an equation $Q_0=C_1(P_A-P_B)$.

Here, $P_A$ is a total pressure or a partial pressure measured by the first ionization vacuum gauge 126 or the first mass spectrometer 127, and $P_B$ is a total pressure or a partial pressure measured by the second ionization vacuum gauge 128 or the second mass spectrometer 129. In the case of measuring the partial pressure, $Q_0$ is an emission gas rate for each type of gas.

By using the above equation, the total emission gas rate inside the image display panel 101 and the gas measuring system of the measuring apparatus, and the gas rate and the partial pressure for each type of gas can be quantitatively obtained.

Subsequently, the emission gas rate at the time of displaying an image is obtained by subtraction of the above-mentioned background $Q_0$. When the image is displayed, assuming that: a DC-converted current value is Ie; the pressure inside the first measuring chamber 120 is $P_1$; and the pressure inside the second measuring chamber 121 is $P_2$, the emission gas rate R per unit current value is obtained by the following $$\text{formula (1): } R=(C_1(P_1-P_2)-Q_0)/Ie \quad (1)$$

Thus, as shown in the formula (1), the value of $C_1(P_1-P_2)-Q_0$ is divided by the DC-converted current value that is an emission amount of electrons from the electron source, resulting in a gas rate by which each image display device can be compared and evaluated according to the same standardized reference without being influenced by the level of a current amount for electron radiation. Also, if a partial region, instead of an entire region, of the image display device is displayed, the emission gas rate can be calculated, thereby improving operation efficiency and saving energy consumption.

The types of gases that can be measured in this arrangement include all the types of gases that can be measured by a mass spectrometer, for example, $H_2$, He, $CH_4$, $NH_3$, $H_2O$, Ne, CO, $N_2$, $O_2$, Ar, $CO_2$, and the like. Among those types of gases, CO and $N_2$ are gases having the same mass number, and their main peaks appear at an ion current peak 28 (AMU 28) in the mass spectrometer. In order to separate CO and $N_2$, a spectrum peculiar to a substance called cracking pattern is used, which is capable of separating the gases having the same mass number.

A calculation example will be shown by using the above-mentioned eleven types of gases. First, the partial pressure of each type of gas is obtained by solving simultaneous equations with respect to eleven ion currents for the respective gases based on the mass spectrometer. Assuming that the ion current peaks (AMUs) of the mass spectrometer corresponding to the respective types of gases, $H_2$, He, $CH_4$, $NH_3$, $H_2O$, Ne, CO, $N_2$, $O_2$, Ar, and $CO_2$, are $I_2$, $I_4$, $I_{14}$, $I_{16}$, $I_{17}$, $I_{18}$, $I_{20}$, $I_{28}$, $I_{32}$, $I_{40}$, and $I_{44}$, respectively, the simultaneous equations are as follows.

$$I_2=a_{2H2}S_{H2}GP_{H2}+a_{2He}S_{He}GP_{He}+a_{2CH4}S_{CH4}GP_{CH4}+\ldots+a_{2co2}S_{2co2}GP_{co2}$$

$$I_4=a_{4H2}S_{H2}GP_{H2}+a_{4He}S_{He}GP_{He}+a_{4CH4}S_{CH4}GP_{CH4}+\ldots+a_{4co2}S_{2co2}GP_{co2}$$

...

...

$$I_{44}=a_{44H2}S_{H2}GP_{H2}+a_{44He}S_{He}GP_{He}+a_{44CH4}S_{CH4}GP_{CH4}+\ldots+a_{44co2}S_{2co2}GP_{co2}$$

Here, for example, $I_2$ denotes an ion current with a mass number 2; $a_{2H2}$, an $I_2$ component in $H_2$ of a cracking pattern matrix; $P_{H2}$, a partial pressure of $H_2$; $S_{H2}$, a sensitivity of $H_2$; and G, a gain. If the simultaneous equations are expressed by a determinant as follows.

$$\begin{pmatrix} I_2 \\ I_4 \\ \vdots \\ I_{44} \end{pmatrix} = \begin{pmatrix} a_{2H2}S_{H2}G & a_{2He}S_{He}G & a_{2CH4}S_{CH4}G & \cdots & a_{2CO2}S_{CO2}G \\ a_{4H2}S_{H2}G & a_{4He}S_{He}G & a_{4CH4}S_{H4}G & \cdots & a_{4CO2}S_{CO2}G \\ \vdots & \vdots & \vdots & \vdots & \vdots \\ a_{44H2}S_{H2}G & a_{44He}S_{He}G & a_{44CH4}S_{H4}G & \cdots & a_{44CO2}S_{CO2}G \end{pmatrix} \begin{pmatrix} P_{H2} \\ P_{He} \\ \vdots \\ P_{CO2} \end{pmatrix}$$

By calculating the above formula, respective pressures can be obtained as $P_{H2}$, $P_{He}$, $P_{CH4}$, $P_{CH3}$, $P_{H20}$, $P_{Ne}$, $P_{CO}$, $P_{N2}$, $P_{CO}$, $P_{Ar}$, and $P_{CO2}$. As to CO and $N_2$ among the eleven types of gases, the emission gas rates of CO and $N_2$ can be calculated from pressure values obtained by the two measuring chambers, a known conductance of the orifice, and the DC-converted current value of the electron source.

Secondly, description will be made of a second method including: a method of introducing a gas; a method of measuring a total gas amount adsorbed to a getter; and a method of calculating a getter lifetime.

First, the method of introducing a gas and the method of measuring a total gas amount adsorbed to a getter are as follows. That is, after measurement of the gas rate using the first method, the valve 109 is closed, and the valve 107 is then opened to activate the third ionization vacuum gauge 130 and the fourth ionization vacuum gauge 131. The total pressures inside the first gas chamber 122 and the second gas chamber 123 are measured by the third ionization vacuum gauge 130 and the fourth ionization vacuum gauge 131, respectively. The gas bomb 132 containing a gas to be introduced is connected to the measuring apparatus. The valves 107 and 134 are closed, and the valve 115 is then opened. After that, a predetermined amount of gas is introduced into the second gas chamber 123 by the mass flow controller 133. After the pressures inside the second gas chamber 123 and the pressure inside the first gas chamber 122 are each increased to a desired pressure and stabilized, the valve 135 is closed and the valve 107 is opened. Assuming that: the conductance of the introduced gas with respect to the orifice 125 is $C_2$; the value on the fourth ionization vacuum gauge 131 of the second gas chamber 123 is $P_4$; and the value on the third ionization vacuum gauge 130 of the first gas chamber 122 is $P_3$, the pressure values $P_4$ and $P_3$ approach each other as the introduced gas is adsorbed to the getter. Assuming that a time required until $P_4$ and $P_3$ become almost the same, that is, a time required until the introduced gas is adsorbed to the getter of the image display panel 101 is T, a total getter adsorption amount for the image display device can be obtained by the following formula (2) in which a product of the conductance of the orifice 125 and a differential pressure between the pressure inside the first gas chamber 122 and the pressure inside the second gas chamber 123 is integrated from the time 0 to the time T:

$$W=\int_0^T C_2(P_4-P_3)\,dt \tag{2}$$

Note that in the formula (2), an amount of the introduced gas existing in a space inside the image display panel 101 and a space from the valve 107 to the image display panel 101 is neglected because the amount is smaller than the amount adsorbed to the getter. After the measurement, the valves 107 and 115 and the mass flow controller 133 are closed. Then, the valves 134 and 135 are opened to exhaust the introduced gas.

Figure 7:
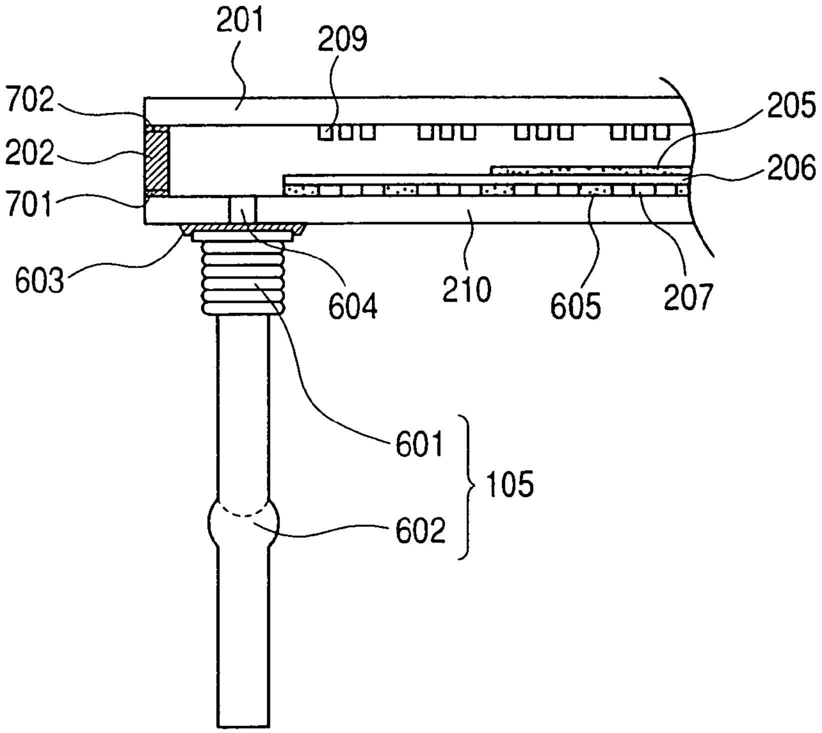
FIG. 7 is a schematic view showing a structure for connecting an image display panel and an exhaust pipe having a breakable vacuum isolating member according to the present invention.

Next, description is made of the method of calculating a getter lifetime. FIG. 7 is a schematic drawing showing a state where the exhaust pipe 105 including a vacuum isolating member 602 is connected to the image display panel 101. The first method is used to measure an emission gas rate $R_1$ at the time of initial image display (time $T_1$) with respect to a surface conduction electron-emitting device 209 formed in a region in which a getter film 205 is not formed in FIG. 7. A large number of emission gas rates are then measured, with the result that the emission gas rates can be expressed by using a power of t. If the emission gas rate R at the time T after the image display is measured, an attenuation index κ of the emission gas rate with respect to time can be obtained as expressed in the following formula (3):

$$R=R_1t^{\kappa} \tag{3}$$

Next, assuming that: the total getter adsorption amount obtained by the second method is W; and the getter lifetime is $T_{end}$, $$W=\int_{T1}^{Tend} R_1t^{\kappa}\,dt$$

can be used for calculation. Performing integration of the above formula leads to the following formula:

$$W=\frac{R_1}{1+\kappa}\left(T_{end}^{1+\kappa}-T_1^{1+\kappa}\right)$$

Thus, $T_{end}$ to be obtained is expressed by the following formula (4):

$$T_{end} \equiv \left( \frac{(1+\kappa)}{R_1} \times W \right)^{\frac{1}{1+\kappa}} \quad (4)$$

As shown in the formula (4), the getter lifetime $T_{end}$ can be obtained by obtaining the emission gas rate $R_1$ at the time of initial image display, the attenuation index κ of the emission gas rate, and the total getter adsorption amount W.

As a material of the getter film, a metal such as Ba, Mg, Ca, Ti, Zr, Hf, V, Nb, Ta, or W, or an alloy thereof can be used. Preferably, an alkaline-earth metal whose vapor pressure is low and which is easy to handle, such as Ba, Mg, or Ca, or an alloy thereof is appropriately used. More preferably, Ba or an alloy containing Ba is used. Ba is inexpensive and industrially easy in manufacturing in that Ba can be easily vaporized from a metal capsule holding the material of the getter. Also, an adsorption gas for evaluating a getter life can be appropriately selected from gases that tend to be adsorbed to a getter, such as $H_2$, $O_2$, $H_2O$, CO, and $CO_2$. In particular, in the case of using Ba or the alloy containing Ba for the getter, CO is more preferably used. CO is excellent in selectively adsorbing power with respect to the getter film, is contained by large amount in the emission gas from the image display panel, and is hardly adsorbed to other members.

Thirdly, description will be made of a method of evaluating influences of a type of gas on an electron source. The method of introducing a gas to be used is the same as that included in the second method. The valve 110 is closed, and the valve 109 is opened to introduce the gas while measuring a pressure by the first ionization vacuum gauge 126. After introducing the gas into the image display panel 101, the valve 107 is closed. The image display device 100 is caused to display an image, and a change over time of the current value Ie is measured to check for the influences of the gas on the electron source. More specifically, a current value retention (a ratio of a current value after displaying an image for a predetermined time to an initial current value) is measured when an Ar gas is not introduced, another current value retention is then measured similarly after introducing the gas, and the two values are compared to check for the influences of the gas on the electron source. As a type of gas to be evaluated, $H_2$, $CH_4$, $H_2O$, CO, $N_2$, $CO_2$, Ar, or the like can be used.

Further, a gas for detecting a leak of an He gas or the like is supplied from an outside of the sealed container according to the present invention in a state where the isolating member is not broken. After an amount introduced into the sealed container due to the leak is integrated with a time, it is preferable to break the isolating member as described above to detect an amount of a leakage gas from an inside of the sealed container.

Figure 2:
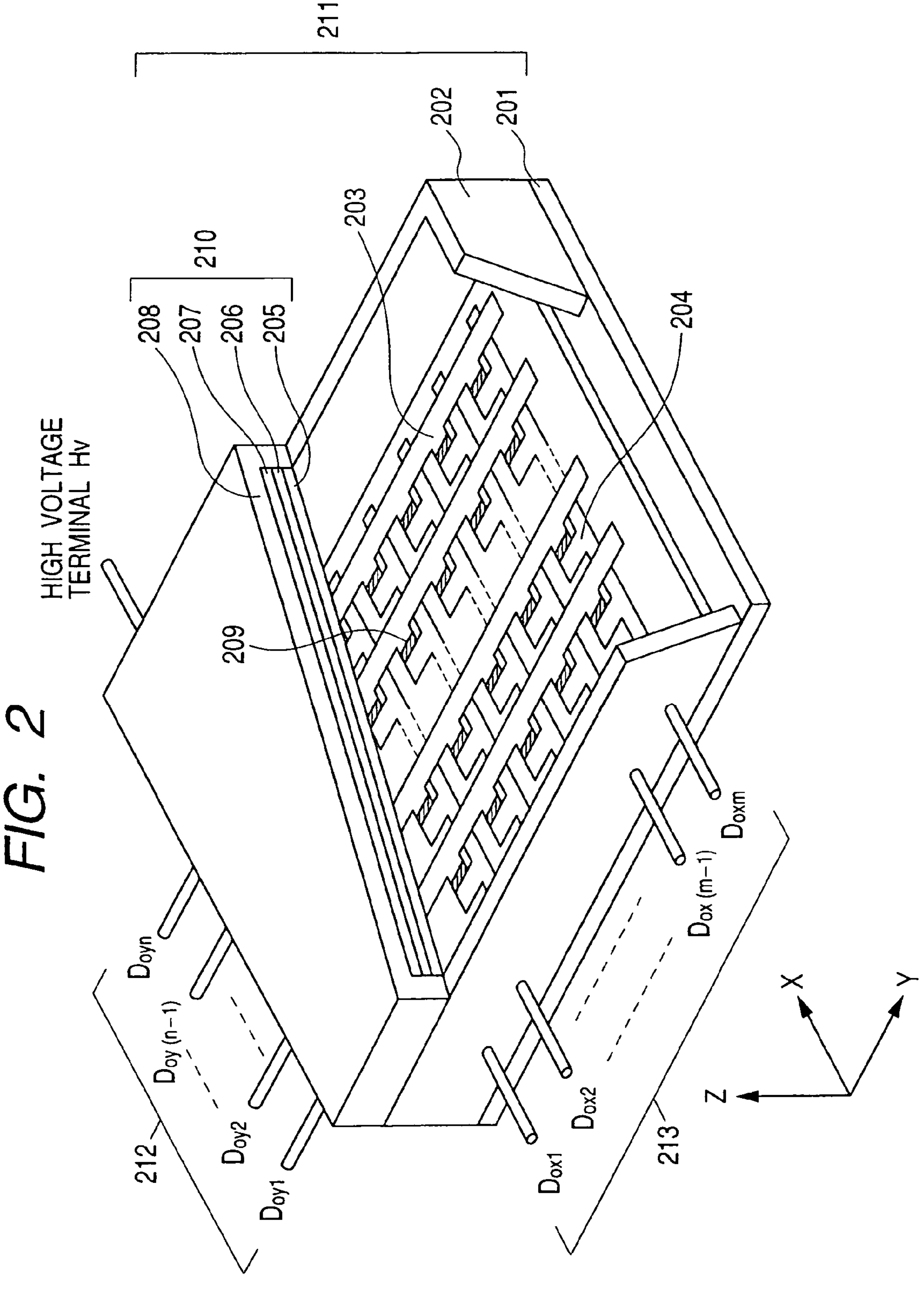
FIG. 2 is a schematic structural view of an image display device used for a gas measurement according to the present invention.

FIGS. 7 and 2 are examples of schematic drawings showing a structure of the image display panel that can be manufactured according to the present invention. In FIG. 7, the exhaust pipe 105 including bellows 601 and the vacuum isolating member 602 is connected to a face plate 210 of the image display panel via a through hole 604 formed to the face plate 210 by means of a connecting member 603 in an airtight state. Also, FIG. 2 shows a detailed structure of the image display panel, in which a rear plate 201, a supporting frame 202, and the face plate 210 are seal-bonded by heat in a vacuum by using a metal such as indium to compose an envelope 211. The face plate 210 includes a transparent glass plate 208, a phosphor 207 applied to an inner side of the transparent glass plate 208, a metal back 206, and the getter film 205. In FIG. 2, a voltage is applied through a modulation signal input terminal 213 composed of outer terminals $Dox_1$ to $Dox_m$ outside the envelope and a scanning signal input terminal 212 composed of outside-container terminals $Doy_1$ to $Doy_n$, and a high voltage is applied through a high-voltage terminal Hv to display an image.

In FIG. 2, reference numeral 209 denotes a surface conduction electron-emitting device as an electron source, and reference numerals 203 and 204 denote an upper wiring (Y-directional wiring) and a lower wiring (X-directional wiring), respectively, which are connected to a pair of device electrodes of the surface conduction electron-emitting device.

Figure 3:
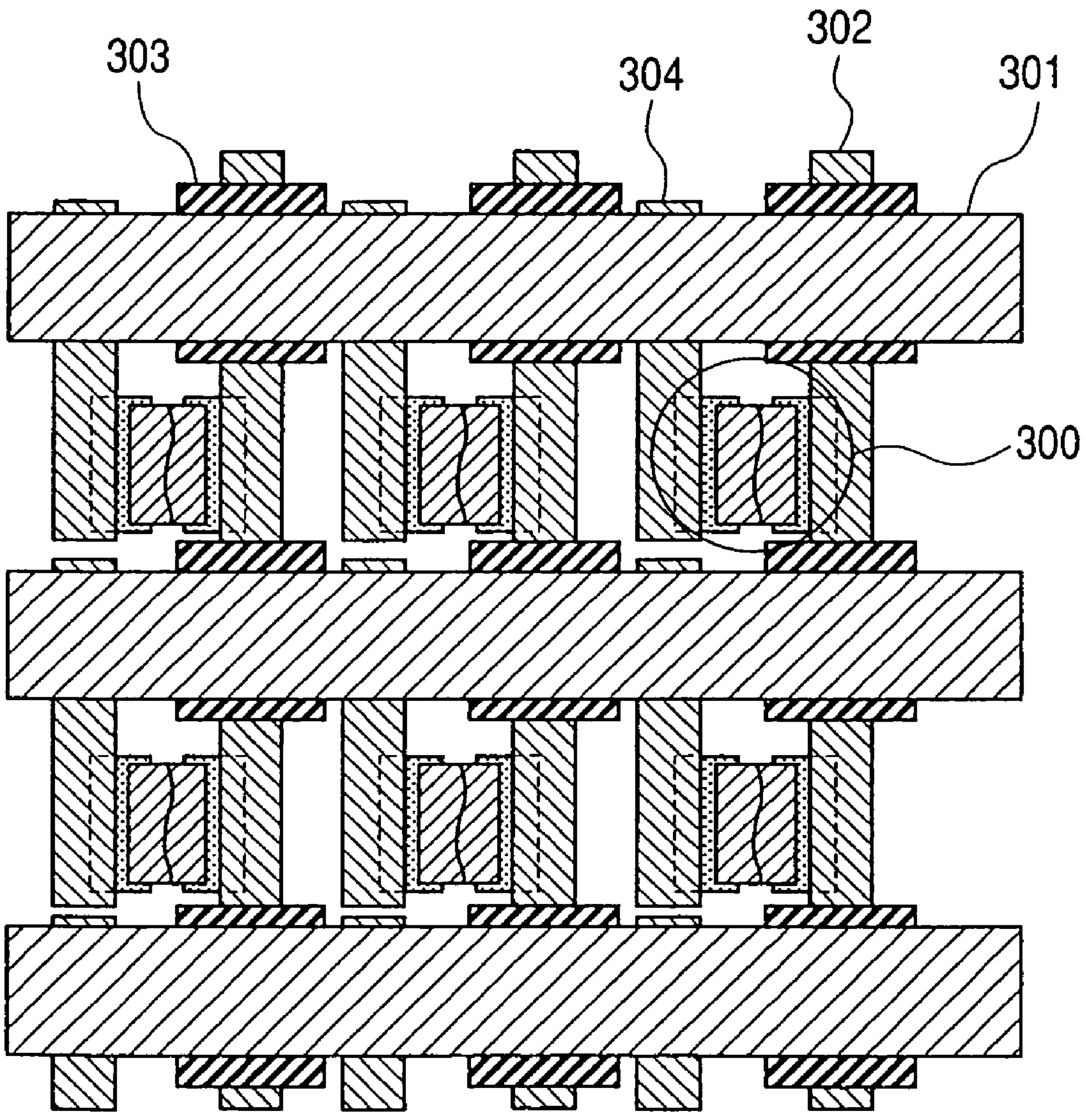
FIG. 3 is a schematic structural view of an upper portion of a rear plate using a surface conduction electron-emitting device according to the present invention.

FIG. 3 is a schematic drawing showing surface conduction electron-emitting devices installed on the rear plate 201, and part of wirings for driving the surface conduction electron-emitting devices as electron sources and the like. In FIG. 3, reference numeral 300 denotes one of plural surface conduction electron-emitting devices; 302, a lower wiring; 301, an upper wiring; 303, an interlayer insulating film for electrically insulating the upper wiring 301 and the lower wiring 302; and 304, a wiring pad.

Figure 4A:
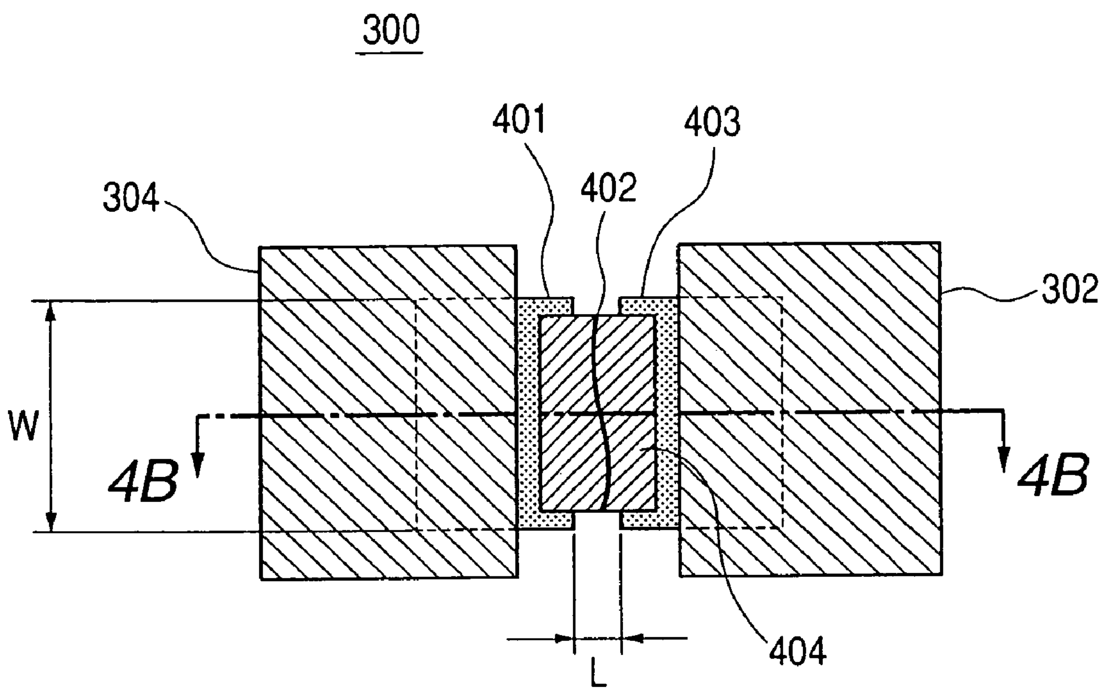
FIGS. 4A and 4B are enlarged structural views of the surface conduction electron-emitting device of FIG. 3 according to the present invention.
Figure 4B:
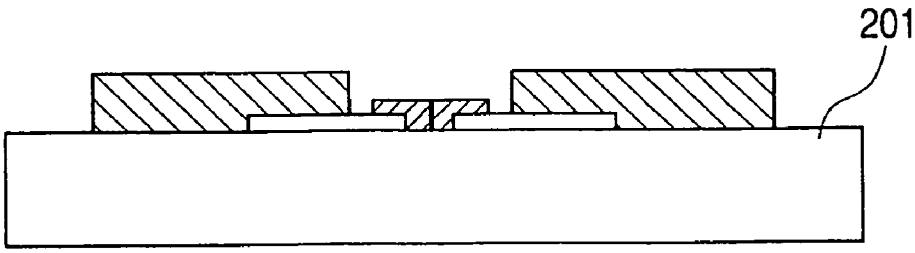

FIGS. 4A and 4B show enlarged structures of the surface conduction electron-emitting device 300. Reference numerals 401 and 403 denote device electrodes, reference numeral 404 denotes a conductive thin film, and reference numeral 402 denotes an electron-emitting section.

Figure 5:
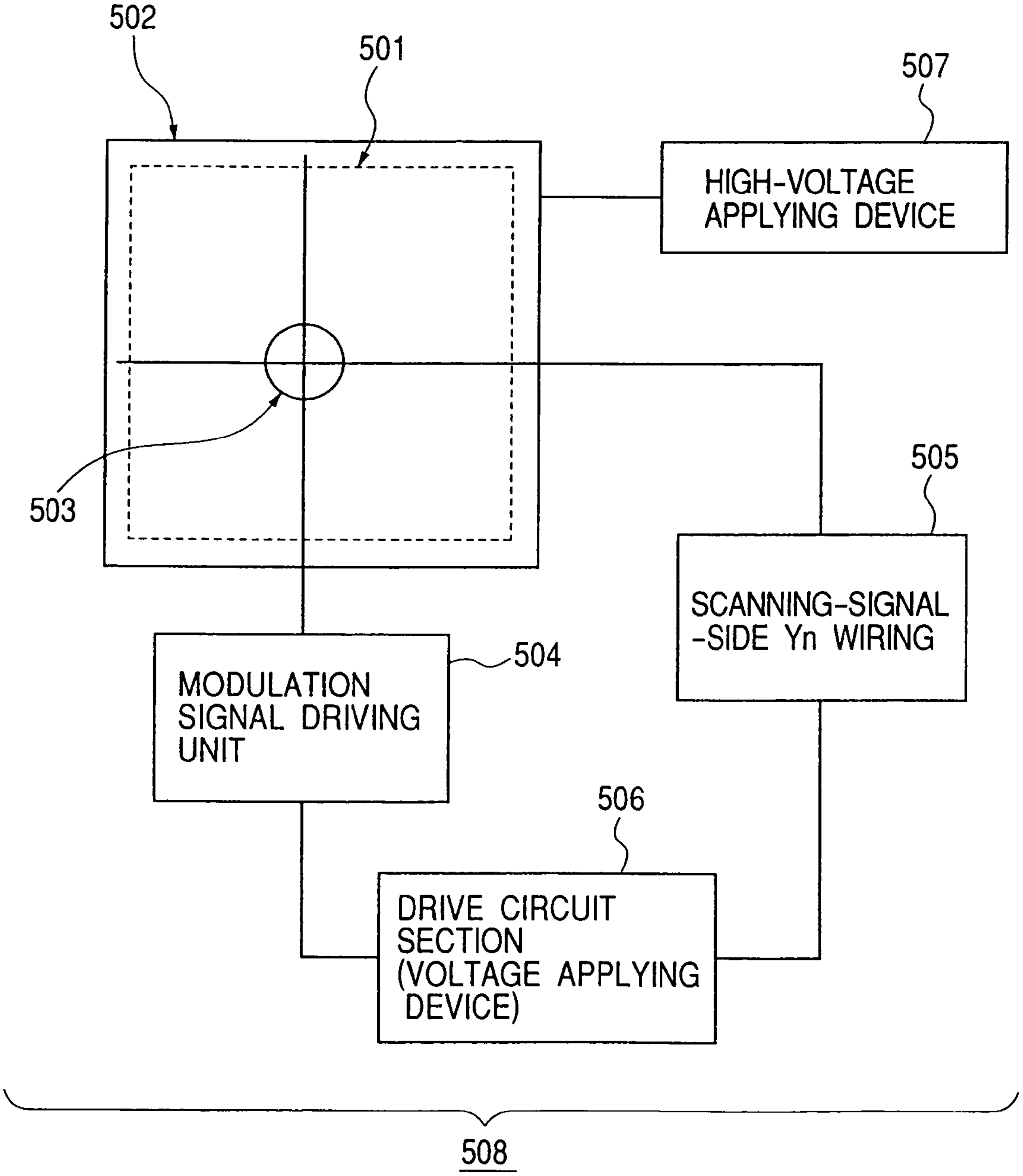
FIG. 5 is a schematic block diagram of an image display device according to the present invention.

FIG. 5 is an example of block diagram showing an image display device. In FIG. 5, reference numeral 508 denotes an image display device; 502, a flat-shaped image display panel as a display device main body; 501, an image display area in the flat-shaped image display panel 502; 504, a modulation-signal-side Xn wiring (corresponding to the lower wiring 302 of FIG. 3) for applying a voltage to a device electrode (denoted by 401 in FIGS. 4A and 4B); 505, a scanning-signal-side Yn wiring (corresponding to the upper wiring 301 of FIG. 3) for applying a voltage to a device electrode (denoted by 403 in FIGS. 4A and 4B); 506, a driver circuit section for driving the modulation-signal-side Xn wiring 504 and the scanning-signal-side Yn wiring 505; and 507, a high-voltage applying device for applying a high voltage to a face plate side in order to cause electrons to collide against the face plate 210.

First, description will be made of an example of the image display device that uses the surface conduction electron-emitting device.

In the structure shown in FIG. 2, used as the rear plate 201 is an insulating plate such as a glass plate having soda glass, borosilicate glass, silica glass, or $SiO_2$ formed on its surface, or a ceramic plate made of alumina or the like. As the face plate 210, a transparent glass plate made of soda glass or the like is used.

As a material of the device electrodes (denoted by 401 and 403 in FIGS. 4A and 4B) of the surface conduction electron-emitting device 209 (corresponding to the surface conduction electron-emitting device 300 of FIG. 3), a general conductor is used. For example, the material is appropriately selected from: a metal such as Ni, Cr, Au, Mo, W, Pt, Ti, Al, Cu, or Pd or an alloy thereof; a printed conductor composed of a metal such as Pd, Ag, Au, $RuO_2$, or Pd—Ag, or a metal oxide thereof, glass, and the like; a transparent conductor such as $In_2O_3$—$SnO_2$; a semiconductor such as poly-silicon; and the like.

The device electrode can be manufactured by using a vacuum evaporation method, a sputtering method, a chemical vapor deposition method, or the like to form a film made of the electrode material selected above, and by using a photolithography technique (including processing techniques such as etching and lift-off) to process the film into a desired shape. Alternatively, other printing methods can be used to manufacture the device electrode. In short, any manufacturing method can be used as far as the device electrode material can be used to form the device electrode into a desired shape.

An inter-device-electrode interval L shown in FIGS. 4A and 4B is preferably several hundreds of nm to several hundreds of μm. As it is demanded to manufacture the device having satisfactory reproducibility, the inter-device-electrode interval L is more preferably several μm to several tens of μm. A length W of the device electrode is preferably several μm to several hundreds of μm due to a resistivity of the electrode, electron-emitting characteristics, and the like. Film thicknesses of the device electrodes 401 and 403 are preferably several tens of nm to several μm.

Note that instead of the structure shown in FIGS. 4A and 4B, another structure may be adopted in which the conductive thin film 404, the device electrode 401, and the device electrode 403 are formed on the rear plate 201 in the stated order.

In order to obtain satisfactory electron-emitting characteristics, it is particularly preferable that the conductive thin film 404 be a fine particle film composed of fine particles. The film thickness of the conductive thin film 404 is set based on a step coverage for the device electrodes 401 and 403, a resistivity between the device electrodes 401 and 403, energization forming conditions described later, and the like, and is preferably 0.1 nm to several hundreds of nm, and more preferably 1 nm to 50 nm. A resistivity of the conductive thin film 404 is equal to a value when Rs is $10^2$ to $10^7$ Ω/□. Note that Rs is an amount obtained when a resistivity R of a thin film having a thickness of t, a width of w, and a length of l is expressed by R=Rs(l/w). Also, as a material composing the conductive thin film 404 can be selected from: a metal such as Pd, Pt, Ru, Ag, Au, Ti, In, Cu, Cr, Fe, Zn, Sn, Ta, W, or Pb; an oxide such as PbO, $SnO_2$, $In_2O_3$, PbO, or $Sb_2O_3$; a boride such as $HfB_2$, $ZrB_2$, $LaB_6$, $CeB_6$, $YB_4$, or $GdB_4$; a carbide such as TiC, ZrC, HfC, TaC, SiC, or WC; an nitride such as TiN, ZrN, or HfN; a semiconductor such as Si or Ge; carbon; and the like.

Note that the fine particle film stated here is a film in which plural fine particles are aggregated. Examples of its fine structure include not only a state where the fine particles are individually dispersed, but also a state where the fine particles are adjacent to each other or overlap each other (including an island-like state). A diameter of the fine particle is 0.1 nm to several hundreds of nm, and preferably 1 nm to 20 nm.

As a manufacturing method for the conductive thin film 404, an organometallic solution is applied to the rear plate 201 provided with the device electrodes 401 and 403 and dried to form an organometallic thin film. The term "organometallic solution" refers to a solution of an organometallic compound that contains a metal selected for forming the conductive thin film 404 as a main element. After that, the organometallic thin film is subjected to a heat baking processing, and patterned by lift-off, etching or the like to form the conductive thin film 404. Note that the formation of the conductive thin film 404 is described by use of a method of applying the organometallic solution, but is not limited thereto. The conductive thin film 404 may be formed by the vacuum evaporation method, the sputtering method, the chemical vapor deposition method, a dispersion coating method, a dipping method, a spinner method, or the like.

The electron-emitting section 402 is a high-resistivity fissure formed in part of the conductive thin film 404, and is formed by an operation called energization forming. In the energization forming operation, energization is performed between the device electrodes 401 and 403 by an electrode (not shown), and the conductive thin film 404 is locally destroyed, deformed, or altered to form the electron-emitting section 402 by changing the structure of the conductive thin film 404. In particular, a voltage waveform at the time of energization is preferably a pulse waveform. There are a case where a voltage pulse having a constant pulse peak value is continuously applied, and a case where a voltage pulse is applied while the pulse peak value is increased.

An example of the case where the pulse peak value is set constant will be described. A triangular waveform is used as the pulse waveform. A pulse width is set to several μsec to 10 msec, a pulse interval is set to several μsec to 100 msec, and a peak value (peak voltage at the time of energization forming) is appropriately selected according to a form of the surface conduction electron-emitting device 300. The voltage pulse with the selected pulse peak value is applied for several sec to several tens of minutes under a preferable pressure equal to or less than the atmospheric pressure, for example, equal to or less than approximately $6.67\times10^{-3}$ Pa. Note that the waveform to be applied between the device electrodes 401 and 403 is not limited to the triangular waveform, and a desired waveform such as a rectangular waveform may be used.

On the other hand, in the case where the voltage pulse is applied while the peak value is gradually increased, the peak value (peak voltage at the time of energization forming) of the triangular waveform is increased by a step of, for example, approximately 0.1 V, and the voltage pulse is applied under a suitable pressure.

Note that in the energization forming operation in this case, a voltage enough to keep the conductive thin film 404 from being locally destroyed or deformed, for example, a voltage of approximately 0.1 V may be applied at a certain time between pulses, and a device current may be measured to obtain a resistivity. When the resistivity of, for example, 1 MΩ or more is obtained, the energization forming operation may be ended.

It is desirable that the device that has undergone the energization forming operation be subjected to an operation called activation. In the activation operation, under a pressure of, for example, approximately $1.33\times10^{-2}$ to $10^{-3}$ Pa, similarly to the energization forming operation, carbon derived from an organic substance existing under a suitable pressure or a carbon compound is deposited on the conductive thin film, and a device current (a current made to flow between the device electrodes 401 and 403) and an emission current (device current emitted from the electron-emitting section 402) are considerably changed. While measuring the device current and the emission current, the activation operation is ended when, for example, the emission current becomes saturated. Application of the voltage pulse is preferably performed at a voltage equal to or larger than an operation driving voltage at the time of image display. The formed fissure may include therein conductive fine particles having a diameter of 0.1 nm to several tens of nm. The conductive fine particles contain at least part of elements of a substance composing the conductive thin film 404. Also, the electron-emitting section 402 and the conductive thin film 404 in the vicinity thereof may include carbon or a carbon compound.

Note that as the surface conduction electron-emitting device 300, a plane type is used in which the surface conduction electron-emitting devices 300 are formed on a plane of the rear plate 201 in a plane shape, but instead, a step type may be used in which the surface conduction electron-emitting devices 300 are formed on a plane perpendicular to the rear plate 201. If an image display device including an electron-emitting device such as a heat electron source using a heat cathode or field emission electron-emitting device is taken as an example, there are not particular limitations as far as a device that emits electrons is used.

Next, FIGS. 3 and 4 are used to describe an array of the surface conduction electron-emitting devices 300 and a wiring that supplies electrical (power) signals for displaying an image to the surface conduction electron-emitting devices 300.

As an example of the wiring, two wirings that are perpendicular to each other (Y: upper wiring 301 and X: lower wiring 302; referred to as a passive matrix wiring) are used. The upper wiring 301 is electrically connected to the device electrode 401 of the surface conduction electron-emitting device 300 through the wiring pad 304. The lower wiring 302 is directly, electrically connected to the device electrode 403 of the surface conduction electron-emitting device 300.

The plural numbers of upper wirings 301, wiring pads 304, and lower wirings 302 are manufactured by the printing method such as a screen printing method or an offset printing method. A conductive paste to be used includes a noble metal such as Ag, Au, Pd, or Pt, a base metal such as Cu or Ni, or a metal obtained by optionally combining the above-mentioned metals. After a wiring pattern is printed by a printing machine, the conductive paste is baked at a temperature equal to or higher than 500° C. Thicknesses of upper and lower printed wirings and the like that are formed are approximately several μm to several hundreds of μm.

Further, at least in a portion in which the upper wiring 301 and the lower wiring 302 are overlapped, a glass paste is printed and baked (at equal to or higher than 500° C.) to form the interlayer insulating film 303 having a thickness of several to several hundreds of μm that is sandwiched to establish electrical insulation.

In order to apply a scanning signal serving as an image display signal for scanning a Y-side row of surface conduction electron-emitting devices 300 in response to an input signal, as shown in FIG. 5, an end portion of the upper wiring 301 in a Y-direction is electrically connected to the driver circuit section 506 as scanning-side electrode driving means. On the other hand, in order to apply a modulation signal serving as an image display signal for modulating each column of surface conduction electron-emitting devices 300 in response to an input signal, as shown in FIG. 5, an end portion of the lower wiring 302 in an X-direction is electrically connected to the driver circuit section 506 as modulation signal driving means.

In addition, formed to the face plate 210 is the through hole 604 for connecting to the exhaust pipe 105 including the breakable vacuum isolating member 602.

The phosphor 207 applied to the inner side of the face plate 210 is composed of only a single phosphor in the case of monochrome. However, in the case of displaying a color image, the phosphor 207 is structured such that phosphors emitting light in three primary colors: red, green, and blue are spaced apart from each other with black conductive materials. The black conductive materials are called black stripes, a black matrix, or the like based on their shape. The phosphor 207 is manufactured by a photolithography method using a phosphor slurry or the printing method, and patterning is performed to a pixel having a desired size to form a phosphor for each color.

Formed on the phosphor 207 is the metal back 206. The metal back 206 is composed of a conductive thin film containing Al or the like. The metal back 206 reflects light traveling toward the rear plate 201 as the electron source among the lights generated in the phosphor 207, thereby improving a luminance. Further, the metal back 206 imparts conductivity to an image display area of the face plate 210 to prevent charges from being accumulated, and serves as an anode electrode with respect to the surface conduction electron-emitting device 209 of the rear plate 201. The metal back 206 also has a function of preventing the phosphor 207 from being damaged by ions generated when gases remaining inside the face plate 210 and the envelope 211 are ionized by electron beams.

In order to apply a high voltage to the metal back 206, as shown in FIG. 5, the metal back 206 is electrically connected to the high-voltage applying device 507. The supporting frame 202 serves to airtightly seal a space between the face plate 210 and the rear plate 201. The supporting frame 202 is bonded to the face plate 210 and the rear plate 201 using frit glass, In, or an alloy thereof to structure a sealed container as an envelope. As a material of the supporting frame 202, the following can be used: the same material as that of the face plate 210 or the rear plate 201; or glass, ceramics, or a metal having almost the same coefficient of thermal expansion as the material of the face plate 210 or the rear plate 201.

After the face plate 210, the supporting frame 202, and the rear plate 201 are prepared, electron-beam cleaning of a plate, formation of the getter film 205 by evaporation, and formation of the sealed container as the envelope 211 (bonding of the supporting frame 202 with the face plate 210 and the rear plate 201) are performed while maintaining a vacuum atmosphere.

Here, as to the formation of the getter film 205 by evaporation, for example, an active Ba film, a Ba alloy film, or the like is formed to a surface of a metal back 206 layer as a getter film by evaporation. Partial evaporation of the getter film 205 can be realized by evaporation using a mask formed of a metal or the like. The getter film 205 of FIG. 7 is formed by such a method.

Figure 6:
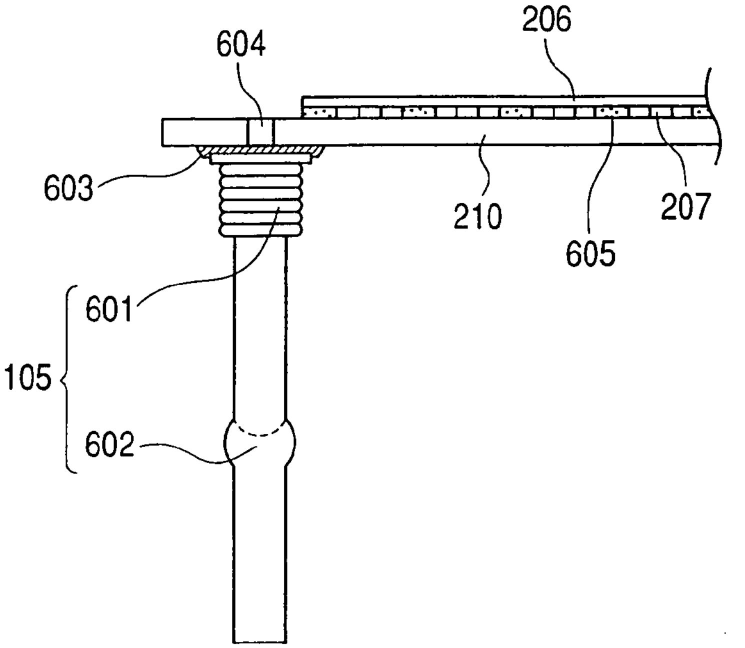
FIG. 6 is a schematic view showing a structure for connecting a face plate and an exhaust pipe having a breakable vacuum isolating member according to the present invention.

According to the present invention, as shown in FIG. 6, the exhaust pipe 105 including the breakable vacuum isolating member 602 that is previously formed is bonded to the face plate 210. In this state, as shown in FIG. 7, the face plate 210, the rear plate 201, and the supporting frame 202 are bonded together to form an image display panel as a sealed container provided with an exhaust pipe. Accordingly, the sealed container for a gas measurement according to the present invention can be achieved.

Another Embodiment

A method of manufacturing the exhaust pipe 105 including the breakable vacuum isolating member 602 having such a structure as shown in FIG. 6 is as follows. That is, in the case of using glass as the exhaust pipe 105 and the breakable vacuum isolating member 602, a disk-like glass plate is first placed in the exhaust pipe. Then, in a state where the disk-like glass plate is heat-melted by a burner or the like from a circumference of the exhaust pipe, a side wall of the exhaust pipe and the disk-like glass plate are fused together by blowing from an end portion of the exhaust pipe to manufacture a thin glass film, that is, the breakable vacuum isolating member 602. As another vacuum isolating member, a metal such as Fe, Ni, Cu, Al, Zn, Ag, Ti, or Au, an alloy thereof, ceramics, or the like can be used. Subsequently, the bellows 601 is manufactured using a metal having almost the same coefficient of thermal expansion as that of glass, and connected to the exhaust pipe by use of a silver brazing alloy member or the like. The metal used for the bellows 601 can be selected from metals having almost the same coefficient of thermal expansion as that of the glass exhaust pipe, for example, FN50 that is an alloy of iron and nickel, 426 alloy, and the like.

Next, the through hole 604 is formed in a portion outside image display area of the face plate 210. After the phosphor 207, a black stripe 605, a metal back 206 film are formed, frit glass or the like is heat-baked with the bellows 601 of the exhaust pipe 105 for connection. Accordingly, the face plate provided with the exhaust pipe 105 can be manufactured.

After that, in the above-mentioned method, formation of the sealed container as the envelope shown in FIG. 7 (bonding of the supporting frame 202 with the face plate 210 provided with the exhaust pipe 105 and the rear plate 201) is performed while maintaining a vacuum atmosphere.

Note that in the case of the image display device for color display, the surface conduction electron-emitting device 209 and a pixel (not shown) of the phosphor 207 correspond to each other in a one-to-one manner. Therefore, the face plate 210 and the rear plate 201 are aligned with each other, and are subjected to seal-bonding in a vacuum.

According to the above steps, a space surrounded by the rear plate 201, the supporting frame 202, and the face plate 210 provided with the exhaust pipe 105 is formed as a container that is capable of maintaining a pressure equal to or less than the atmospheric pressure.

After a series of processings described above, the sealed container is made into the image display device. In the image display device manufactured as described above, by the scanning-side electrode driving unit (denoted by 301 in FIG. 3 and 505 in FIG. 5) connected to the upper wiring 203 and the modulation signal driving unit (denoted by 302 in FIG. 3 and 504 in FIG. 5) connected to the lower wiring 204, the scanning signal and the modulation signal as image signals are supplied to each of the surface conduction electron-emitting device 209 and the surface conduction electron-emitting device 300.

A driving voltage, that is, an electrical signal is applied as a differential voltage between the image signals, and a current is made to flow in the conductive thin film 404. Electrons are emitted from the electron-emitting section 402 formed with a fissure in part thereof as an electron beam in accordance with the electrical signals, and accelerated due to a high voltage (1 to 10 KV) applied by the metal back 206 and the phosphor 207. Then the electrons collide against the phosphor 207 to cause the phosphor to emit light. Thus, an image is displayed.

Note that the metal back 206 here is aimed to reflect light incident to an inner surface side of the phosphor by a mirror surface toward a face plate 210 side to improve the luminance; to function as an electrode for applying an electron beam accelerating voltage; and to protect the phosphor 207 from being damaged by collision of negative ions generated inside the sealed container.

The present invention may be adopted for an image display device using the field emission electron-emitting device, as well as the surface conduction electron-emitting device, as the electron source described above; an image display device of a type that controls the electron beam emitted from the electron source by using a control electrode (grid electrode wiring) to display an image, as well as a passive matrix type; an image display device utilizing plasma discharge; and the like.

In short, the gas measuring method and the gas measuring apparatus for implementing the gas measuring method according to the present invention can be used in the case of using a device or apparatus in which the exhaust pipe having the breakable vacuum isolating member is connected to the sealed container and which requires to maintain the inside of the sealed container to a pressure equal to or less than the atmospheric pressure.

(Manufacturing Method for Sealed Container)

Plural rear plates are prepared as first plates.

Also, plural face plates are prepared as second plates.

Exhaust pipes having a breakable vacuum isolating member are connected to some of the plural face plates.

In order to manufacture a sealed container to be a product, a pair of plates composed of the first plate and the second plate that is not provided with the exhaust pipe having a breakable vacuum isolating member are seal-bonded such that its inside can be maintained to a pressure equal to or less than the atmospheric pressure. Thus, plural sealed containers to be products are manufactured.

On the other hand, in order to manufacture a sealed container to be a measurement sample, a pair of plates composed of the first plate and the second plate that is provided with the exhaust pipe having a breakable vacuum isolating member are seal-bonded such that its inside can be maintained to a pressure equal to or less than the atmospheric pressure. Thus, at least one sealed container to be measurement sample is manufactured.

In order to set characteristics of the measurement sample and the product to be the same, all the steps except the step of attaching a breakable vacuum isolating member are shared between the measurement sample and the product. That is, the measurement sample and the product are preferably made to flow in the same production line. At least one sealed container as the measurement sample is preferably manufactured for every group of plural sealed containers as the products (for every lot).

In order to evaluate the product, the sealed container as the measurement sample manufactured in the same production line or the same lot is prepared.

Then, the isolating member of the measurement sample is broken, and the gas measurement is performed on the inside of the measurement sample (sealed container) Accordingly, the measurement results are regarded as the measurement results of the product for evaluation.

By this procedure, evaluation can be performed without breaking the product itself. If a slight increase is allowed to a manufacturing cost, the exhaust pipe can also be attached to the sealed container to be the product, enabling the gas measurement.

Preferably, the exhaust pipe is connected to the plate through the bellows.

Further, the breakable vacuum isolating member is preferably formed of at least one selected from a metal, an alloy, a metallic compound, and glass which have a thickness enough to be kept from being broken merely due to a differential pressure between the inside and outside of the sealed container.

At the time of measurement, the exhaust pipe is installed on a lower side of an image display surface, and it is preferable to break the breakable vacuum isolating member using a member whose forward end is incisive.

Hereinafter, specific description will be made of examples according to the present invention.

EXAMPLE 1

Figure 8:
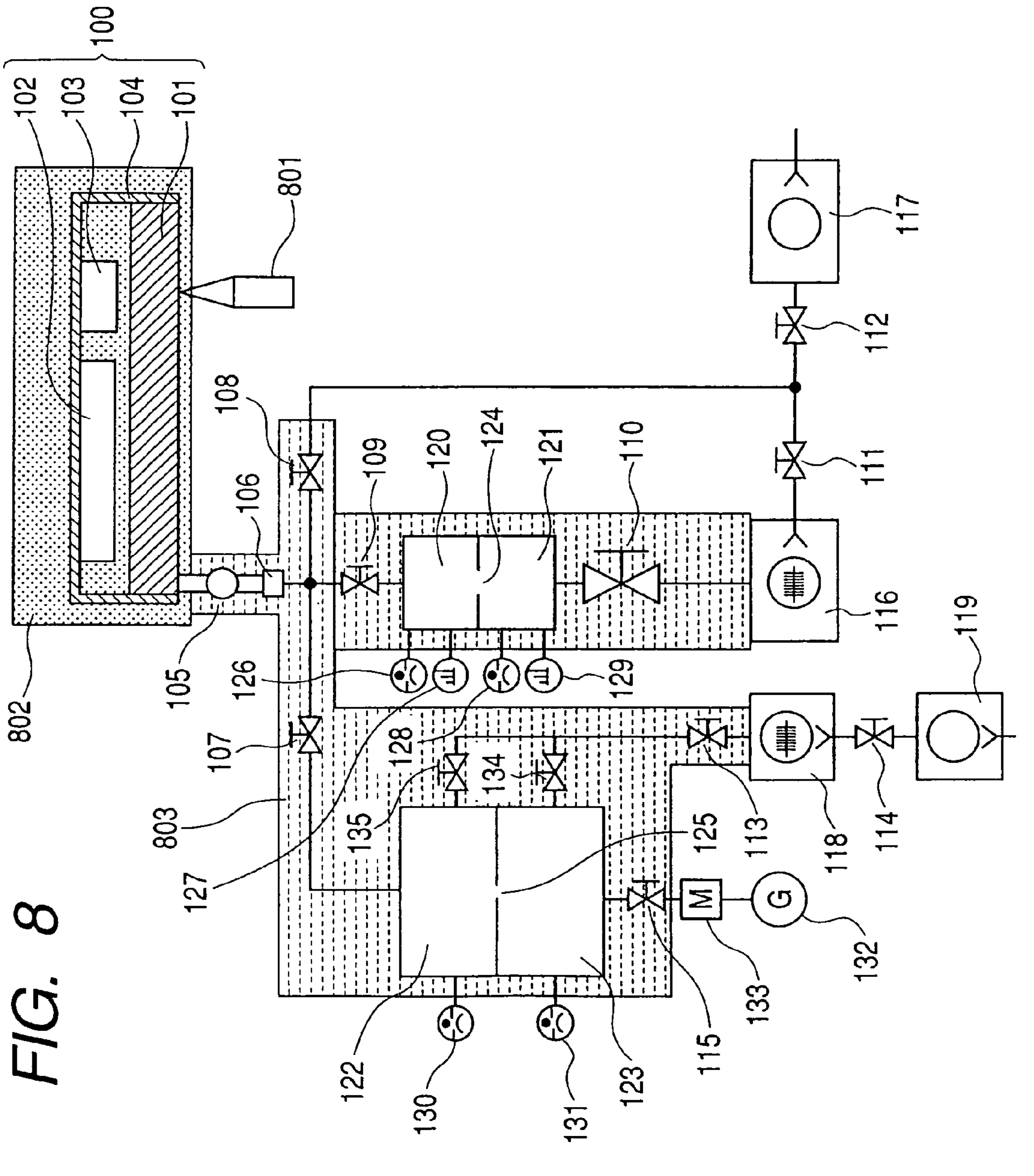
FIG. 8 is a diagram showing a structure of another gas measuring apparatus for an image display device according to the present invention.

Referring to FIG. 8, the gas measuring method using the measuring apparatus for the image display device is described. Also, referring to FIGS. 2 to 7, a method of manufacturing the sealed container as the image display device that has undergone the gas measurement is described.

First, description will be made of the method of manufacturing the sealed container as the image display device. As the rear plate 201, soda glass (SL; manufactured by Nippon Sheet Glass Co., Ltd.) having a thickness of 2.8 mm and a size of 240 mm×320 mm was used. As the face plate 210, soda glass (SL; manufactured by Nippon Sheet Glass Co., Ltd.) having a thickness of 2.8 mm and a size of 190 mm×270 mm was used.

As the device electrodes 401 and 403 of the surface conduction electron-emitting device 209 as the electron source, a platinum film was formed on the rear plate 201 by the evaporation method, and processed by the photolithography technique (including processing techniques such as etching and lift-off) into a shape in which the film thickness is 100 nm, the inter-device-electrode interval L is 2 μm, and the length W of the device electrode is 300 μm.

After application of a solution containing organic palladium (CCP-4230; manufactured by Okuno Pharmaceutical Co., Ltd.) as the organometallic solution, the resultant film was subjected to heat treatment at 300° C. for 10 minutes to form a fine particle film composed of fine particles (with an average particle diameter of 8 nm) containing palladium as a main component. The fine particle film was processed by the photolithography technique (including the processing techniques such as etching and lift-off) to form the conductive thin film 404 having a size of 200×100 μm.

Subsequently, Ag paste ink was printed and baked to form the upper wirings 301 (100 wirings) having a width of 500 μm and a thickness of 12 μm, and the lower wirings 302 (600 wirings) and the wiring pads 304 (60000 pads) which have a width of 300 μm and a thickness of 8 μm. A glass paste was printed and baked (at a baking temperature of 550° C.) to form the interlayer insulating film 303 having a thickness of 20 μm.

After being vacuum-exhausted by a dedicated apparatus, the rear plate 201 was applied with a voltage pulse having a triangular waveform (a base of 1 msec, a period of 10 msec, and a peak value of 5 V) for 60 sec to form the electron-emitting section 402 (forming operation). Further, benzonitrile was introduced therein to perform activation.

On the other hand, as shown in FIG. 6, the single through hole 604 for the exhaust pipe 105 provided with the breakable vacuum isolating member having a hole diameter Φ of 9.0 mm was formed in the face plate 210. In the face plate 210, green phosphor (P22GN4; manufactured by Kasei Optonix, Ltd.) was applied thereto as the phosphor 207, and further aluminum having a thickness of 200 nm was formed thereto as the metal back 206 by using a polymer filming method.

With regard to the exhaust pipe 105 having the breakable vacuum isolating member 602 shown in FIG. 6, a glass plate having a diameter of 9.95 mm and a thickness of 1 mm was inserted into a glass exhaust pipe having a thickness of 1 mm, an outer diameter of 12 mm (an inner diameter of 10 mm), and a length of 100 mm at a portion 30 mm apart from an end portion of the glass exhaust pipe. The glass exhaust pipe was heated from its outside by a gas burner. After glass was melted and the glass plate inside the glass exhaust pipe became soft, a thin glass film (approximately 0.3 mm) for dividing the exhaust pipe, that is, breakable seal glass 602 was obtained by blowing from one end of the glass exhaust pipe. After that, the bellows 601 made of a stainless steel was connected to the glass exhaust pipe by using the silver brazing alloy member while securing airtightness. Only the face plates that are used as the measurement sample among a large number of face plates were attached with the exhaust pipe 105.

As the frit glass 603 to be applied to the portion formed with the through hole 604 in which a bellows 601 end of the exhaust pipe 105 and the face plate 210 contact each other, LS-3081 manufactured by Nippon Electric Glass Co, Ltd. was used, and heated in a baking furnace at 410° C. for 20 minutes to be fixed.

The shape of the supporting frame 202 has a thickness of 6 mm, an outer size of 150 mm×230 mm, and a width of 10 mm, and soda glass (SL; manufactured by Nippon Sheet Glass Co., Ltd.) was used as a material of the supporting frame 202. In order to seal-bond the supporting frame 202 and the rear plate 201, LS-3081 manufactured by Nippon Electric Glass Co, Ltd. was used as the frit glass, and heated in the baking furnace at 410° C. for 20 minutes to be fixed.

The plate obtained by seal-bonding the supporting frame 202 and the rear plate 201, and the face plate 210 having the exhaust pipe 105 were introduced into a vacuum chamber (not shown). After the pressure was reduced to equal to or less than $1\times1^{-5}$ Pa, the plates were heated at 300° C. for 10 hours, and subjected to degasification. After cooling, the face plate 210 having the exhaust pipe 105 was subjected to the electron-beam cleaning. After that, a Ba film that is active as the getter film 205 was formed by evaporation over the entire metal back 206 film.

On the other hand, after cooling, the plate obtained by seal-bonding the supporting frame 202 and the rear plate 201, and the face plate 210 having the exhaust pipe 105 were bonded to each other by using In or an In alloy as a bonding material, and heated to 200° C. for seal-bonding, obtaining the sealed container. After that, the sealed container was cooled down to the room temperature, and taken out of the vacuum chamber that has undergone an atmosphere leak.

In the sealed container and the breakable vacuum isolating member 602 which were manufactured as described above, neither crack nor fissure has developed. This sealed container was connected to the voltage applying device 102 and the high-voltage applying device 103 through cables so as to be able to display an image, and those were received in the external frame 104 to assemble the image display device. The sealed container other than the measurement sample was assembled in accordance with the similar steps to manufacture the image display device.

FIG. 8 shows how the image display device 100 assembled as the measurement sample is connected to the gas measuring apparatus through the exhaust pipe 105. In FIG. 8, reference numeral 801 denotes a luminance meter for measuring a brightness at the time of image display; 802, a thermostatic chamber capable of heating up to 100° C.; and 803, a device baking system capable of heating to a given temperature up to 300° C. The other members that are the same as those shown in other figures are denoted by the same reference numerals. Further description will be made of the main part members. As the first ionization vacuum gauge 126, the second ionization vacuum gauge 128, the third ionization vacuum gauge 130, and the fourth ionization vacuum gauge 131, an extractor gauge IE514 manufactured by Leybold Vacuum Japan Co., Ltd. was used. As the first mass spectrometer 127 and the second mass spectrometer 129, a quadrupole mass spectrometer H200M manufactured by Leybold Vacuum Japan Co., Ltd. was used. As the turbo-molecular pumps 116 and the turbo-molecular pump 118, TH250M manufactured by Osaka Vacuum, Ltd. was used. As the dry pump 117 and the dry pump 119, DS500L manufactured by Mitsubishi Electric Corporation was used. Further, as an orifice plate of the measuring chamber, a nickel plate having a thickness of 0.6 mm was used, and a hole having a diameter Φ of 6 mm was formed therein as the orifice 124. The conductance at this time is $2.976\times10^{-3}$ $m^3$/sec. As an orifice plate of the gas chamber, a nickel plate having a thickness of 0.6 mm was used, and a hole having a diameter Φ of 0.6 mm was formed therein as the orifice 125. The conductance at this time is $1.628\times10^{-5}$ $m^3$/sec.

Next, description will be made of the measuring method for an emission gas rate. In advance, the valves 107 to 109 were closed, the valves 110 to 115, 134, and 135 were opened, the turbo-molecular pumps 116 and 118 and the dry pumps 117 and 119 were activated, and the spaces inside the first measuring chamber 120, the second measuring chamber 121, the first gas chamber 122, and the second gas chamber 123 were each vacuum-exhausted to a pressure equal to or less than approximately $10^{-5}$ Pa. Then, the valve 115 was closed. One end of the exhaust pipe 105 was connected to the exhaust pipe adapter 106 using the O-ring. Subsequently, the valves 110 and 111 were closed and the valve 108 was opened to vacuum-exhaust a space before a breakable vacuum isolating member section of the exhaust pipe 105 to approximately 1 Pa. The valve 108 was then closed and the valves 109 to 111 were opened to be vacuum-exhausted to a pressure equal to or less than $10^{-5}$ Pa by the turbo-molecular pump. The first ionization vacuum gauge 126, the first mass spectrometer 127, the second ionization vacuum gauge 128, and the second mass spectrometer 129 were activated. After that, a leak check was performed with respect to He, but no leak was detected.

Next, the entire gas measuring apparatus was heated in the device baking system 803 at 200° C. for 10 hours, and subjected to the degasification of the components and the measuring systems.

Next, the breakable vacuum isolating member 602 was broken by being punctured with a rod made of SUS (not shown) whose forward end is incisive and which was provided to the lower portion of the exhaust pipe adapter 106. After breakage, when the values of the first ionization vacuum gauge 126 and the second ionization vacuum gauge 128 were stabilized, the first mass spectrometer 127 and the second mass spectrometer 129 were used to measure the first measuring chamber 120 and the second measuring chamber 121, respectively. Thus, the emission gas rate $Q_0$ on the background (emission gas rate at the time when an image is not displayed) was obtained.

As the types of gases to be measured, eight types of gases: $H_2$, $CH_4$, $H_2O$, CO, $N_2$, $O_2$, Ar, and $CO_2$, were used, and as the peak currents (AMUs), 2, 14, 16, 18, 28, 32, 40, and 44 were used. The cracking patterns (1860 Hartog Drive, San Jose, Calif. 95131) of the respective AMUs are shown in Table 1.

TABLE 1

| Table of cracking pattern coefficient | | | | | | | | |
|---|---|---|---|---|---|---|---|---|
| | 2 | 14 | 16 | 18 | 28 | 32 | 40 | 44 |
| $H_2$ | 1.000 | 0.000 | 0.000 | 0.000 | 0.000 | 0.000 | 0.000 | 0.000 |
| $CH_4$ | 0.005 | 0.156 | 1.000 | 0.000 | 0.000 | 0.000 | 0.000 | 0.000 |
| $H_2O$ | 0.000 | 0.000 | 0.011 | 1.000 | 0.000 | 0.000 | 0.000 | 0.000 |
| CO | 0.000 | 0.006 | 0.009 | 0.000 | 1.000 | 0.000 | 0.000 | 0.000 |
| $N_2$ | 0.000 | 0.072 | 0.000 | 0.000 | 1.000 | 0.000 | 0.000 | 0.000 |
| $O_2$ | 0.000 | 0.000 | 0.114 | 0.000 | 0.000 | 1.000 | 0.000 | 0.000 |
| Ar | 0.000 | 0.000 | 0.000 | 0.000 | 0.000 | 0.000 | 1.000 | 0.000 |
| $CO_2$ | 0.000 | 0.000 | 0.083 | 0.000 | 0.111 | 0.000 | 0.000 | 1.000 |

A coefficient SG (A/Pa) obtained by multiplying a sensitivity (S) by a gain (G) of each type of gas used for the simultaneous equations is shown in Table 2.

TABLE 2

| SG value of each type of gas | | | | | | | |
|---|---|---|---|---|---|---|---|
| $H_2$ | $CH_4$ | $H_2O$ | CO | $N_2$ | $O_2$ | Ar | $CO_2$ |
| 0.44 | 1.6 | 1.0 | 1.05 | 1.0 | 1.0 | 1.2 | 1.4 |

Simultaneous equations were set up based on Tables 1 and 2 and values of the respective peak currents to calculate the pressure $P_1$ (Pa) and the pressure $P_2$ (Pa) of each type of gas. The calculation results and values $Q_0$ (Pa·m$^3$/sec) calculated based thereon are shown in Table 3.

TABLE 3

| Emission gas rate ($Q_0$) of each type of gas on the background | | | | |
|---|---|---|---|---|
| | $P_1$ | $P_2$ | $C_1$ | $Q_0$ |
| $H_2$ | $7.31857 \times 10^{-8}$ | $5.42116 \times 10^{-9}$ | $1.11362 \times 10^{-2}$ | $7.54639 \times 10^{-10}$ |
| $CH_4$ | $7.41611 \times 10^{-10}$ | $5.49342 \times 10^{-11}$ | $3.93724 \times 10^{-3}$ | $2.70361 \times 10^{-12}$ |
| $H_2O$ | $2.05375 \times 10^{-11}$ | $1.52129 \times 10^{-12}$ | $3.71207 \times 10^{-3}$ | $7.05893 \times 10^{-14}$ |
| CO | $1.11254 \times 10^{-9}$ | $8.88234 \times 10^{-11}$ | $2.97627 \times 10^{-3}$ | $3.04686 \times 10^{-12}$ |
| $N_2$ | $1.09865 \times 10^{-8}$ | $8.87588 \times 10^{-10}$ | $2.97627 \times 10^{-3}$ | $3.00571 \times 10^{-11}$ |
| $O_2$ | $1.56133 \times 10^{-10}$ | $1.15654 \times 10^{-11}$ | $2.78405 \times 10^{-3}$ | $4.02483 \times 10^{-13}$ |
| Ar | $2.50108 \times 10^{-11}$ | $1.85265 \times 10^{-12}$ | $2.49013 \times 10^{-3}$ | $5.76668 \times 10^{-14}$ |
| $Co_2$ | $2.57500 \times 10^{-9}$ | $1.90741 \times 10^{-10}$ | $2.37425 \times 10^{-3}$ | $5.66082 \times 10^{-12}$ |

The values of emission gas rates separated into CO and $N_2$ could be simply obtained with high precision. The total amount of the emission gas rates of CO and $N_2$ coincided with a value obtained from the pressure at AMU 28 directly converted by the mass spectrometer.

Next, from the voltage applying device 102 connected to the image display panel, an image signal of 167 μsec, 60 Hz, and 15 V was supplied to electron-emitting devices in a single line (600 devices) in a region formed with the Ba getter film. At the same time, a high voltage of 10 KV was applied to the electron-emitting devices by the high-voltage applying device 103 to cause the surface conduction electron-emitting device 300 to emit light. Thus, an image was displayed in the image display device 100. A current value was measured by installing a current probe to a cable that applies a high voltage from the high-voltage applying device 103 to the image display panel 101. The current value was 10 μA for each device. The emission gas rate R (Pa·m$^3$/sec/μA) per unit current value of each gas at this time is shown in Table 4. Note that the same calculation method was also used here as that used to obtain the background $Q_0$ (Pa·m$^3$/sec), and the result was further divided by the DC-converted current value Ie to obtain R.

TABLE 4

Emission gas rate (R) of each type of gas at the time of image display

| | $P_1$ (Pa) | $P_2$ (Pa) | $C_1$ ($m^3$/sec) | $C_1(P_1 - P_2)$ (Pa · $m^3$/sec) | $Q_0$ (Pa · $m^3$/sec) | $C_1(P_1 - P_2) - Q_0$ | DC-converted current value Ie μA | R (Pa · $m^3$/sec/μA) |
|---|---|---|---|---|---|---|---|---|
| $H_2$ | $1.99799 \times 10^{-5}$ | $2.45207 \times 10^{-7}$ | $1.11362 \times 10^{-2}$ | $2.19769 \times 10^{-7}$ | $7.54639 \times 10^{-10}$ | $2.19015 \times 10^{-7}$ | 60 | $3.65024 \times 10^{-9}$ |
| $CH_4$ | $8.90714 \times 10^{-6}$ | $1.09315 \times 10^{-7}$ | $3.93724 \times 10^{-3}$ | $3.46392 \times 10^{-8}$ | $2.70361 \times 10^{-12}$ | $3.46365 \times 10^{-8}$ | | $5.77274 \times 10^{-10}$ |
| $H_2O$ | $4.67965 \times 10^{-10}$ | $5.74321 \times 10^{-12}$ | $3.71207 \times 10^{-3}$ | $1.7158 \times 10^{-12}$ | $7.05893 \times 10^{-14}$ | $1.64521 \times 10^{-12}$ | | $2.74202 \times 10^{-14}$ |
| CO | $1.11354 \times 10^{-9}$ | $8.88900 \times 10^{-11}$ | $2.97627 \times 10^{-3}$ | $3.04964 \times 10^{-12}$ | $3.04686 \times 10^{-12}$ | $2.77805 \times 10^{-15}$ | | $4.63009 \times 10^{-17}$ |
| $N_2$ | $4.06000 \times 10^{-7}$ | $4.90800 \times 10^{-9}$ | $2.97627 \times 10^{-3}$ | $1.19376 \times 10^{-9}$ | $3.00571 \times 10^{-11}$ | $1.16370 \times 10^{-9}$ | | $1.93950 \times 10^{-11}$ |
| $O_2$ | $4.05712 \times 10^{-10}$ | $4.97920 \times 10^{-12}$ | $2.78405 \times 10^{-3}$ | $1.11566 \times 10^{-12}$ | $4.02483 \times 10^{-13}$ | $7.13179 \times 10^{-13}$ | | $1.18863 \times 10^{-14}$ |
| Ar | $4.30178 \times 10^{-10}$ | $5.27946 \times 10^{-12}$ | $2.49013 \times 10^{-3}$ | $1.05805 \times 10^{-12}$ | $5.76668 \times 10^{-14}$ | $1.00039 \times 10^{-12}$ | | $1.66731 \times 10^{-14}$ |
| $Co_2$ | $9.28079 \times 10^{-9}$ | $1.13901 \times 10^{-10}$ | $2.37425 \times 10^{-3}$ | $2.17644 \times 10^{-11}$ | $5.66082 \times 10^{-12}$ | $1.61036 \times 10^{-11}$ | | $2.68394 \times 10^{-13}$ |

In Table 4, the gas rate R of CO is extremely smaller than the other gas rates. On the other hand, the emission gas rate R of $N_2$ takes a large value. As a result, it was understood that CO was adsorbed to the Ba getter film. The same is true of the other adsorbed gases.

Next, the gas rate R for every line was measured at the time of image display, leading to the same results as in Table 4. Further, the device was driven to make the current value double, with the result that the emission gas amount $C_1(P_1-P_2)$ was increased. However, the emission gas rate R per unit current value was calculated to obtain the same results as in Table 4.

As described above, the emission gas rate of each type of gas at the time when an image was displayed in the image display device 100 as the measurement sample could be calculated quantitatively with high precision. Also, the emission gas rate R of each type of gas is calculated as the emission gas rate R per unit current value, so that the emission gas rate R can be used as the same reference even in the case where the current value varies.

Further, the emission gas rates of CO and $N_2$ can be measured respectively. In the case where CO is used as the getter adsorption gas as will be described in Example 2, the attenuation index of the emission gas rate of CO can be accurately calculated from the emission gas rate of CO. Accordingly, the getter life of the image display device can be accurately calculated. Thus-obtained measurement data of the sample can be used for evaluation as the prediction data for an apparatus (sealed container) that has no exhaust pipe and is to be shipped as the product.

EXAMPLE 2

In Example 2, the image display devices to be the sample and the product were manufactured in the same manner as in Example 1 except that 10 lines of devices (6000 devices) were formed, as shown in FIG. 7, using a mask made of SUS when Ba evaporation was performed to the region in which the Ba getter film 205 was not formed. Then, the sample was used to perform the gas measurement.

From the voltage applying device 102, an image signal of 167 μsec, 60 Hz, and 15 V was supplied to electron-emitting devices in a single line (600 devices) in a region in which the Ba getter film 205 was not formed. At the same time, a high voltage of 10 KV was applied to the electron-emitting devices by the high-voltage applying device 103 to cause the surface conduction electron-emitting device 209 to emit light. Thus, an image was displayed in the image display device 100. The emission gas rate of CO was measured similarly to Example 1.

When the emission gas rate of CO at the time of initial image display (time 1 minute after the image display when the high voltage application is stabilized) is $R_1$ (Pa·$m^3$/sec/μA), and the emission gas rate of CO after the image was displayed for 24 hours is $R_2$ (Pa·$m^3$/sec/μA), the measurement results are shown in Table 5.

TABLE 5

Emission gas rate of CO

| T | $P_1$ (Pa) | $P_2$ (Pa) | $C_1$ ($m^3$/sec) | $C_1(P_1 - P_2)$ (Pa · $m^3$/sec) | $Q_0$ (Pa · $m^3$/sec) | $C_1(P_1 - P_2)$ $Q_0$ | DC-converted current value Ie (μA) | | R (Pa · $m^3$/sec/μA) |
|---|---|---|---|---|---|---|---|---|---|
| 1 minute | $4.54965 \times 10^{-6}$ | $5.16308 \times 10^{-8}$ | $2.97627 \times 10^{-3}$ | $1.33873 \times 10^{-8}$ | $3.04686 \times 10^{-12}$ | $1.33843 \times 10^{-8}$ | 60 | $R_1$ | $2.23072 \times 10^{-10}$ |
| 24 hours | $1.56785 \times 10^{-6}$ | $1.73847 \times 10^{-8}$ | | $4.61156 \times 10^{-9}$ | | $4.61156 \times 10^{-9}$ | | $R_2$ | $7.68594 \times 10^{-11}$ |

Figure 9:
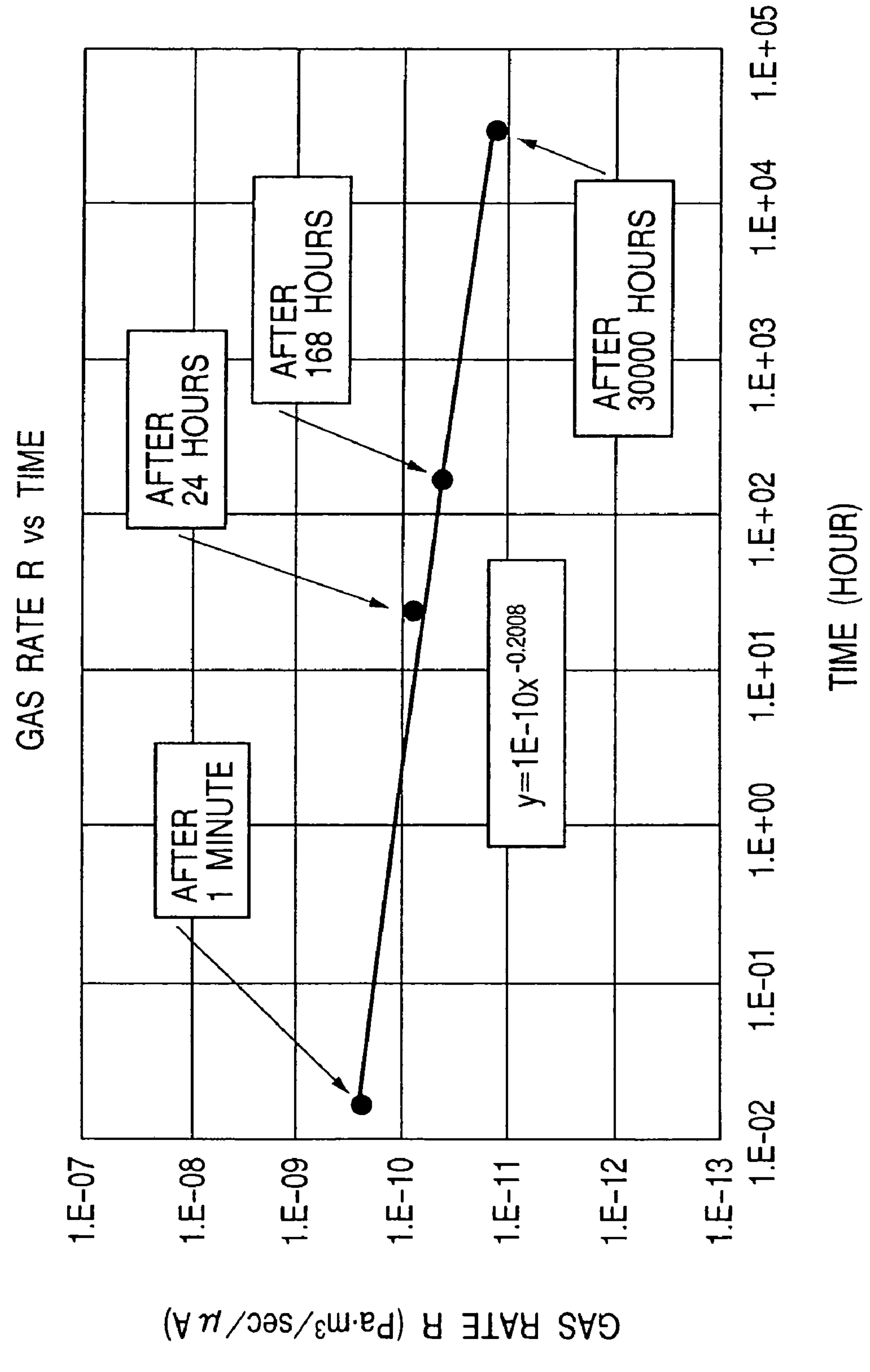
FIG. 9 is a correlation diagram between a time and an emission gas rate of CO in an image display device according to the present invention.

The formula (3) described above was used to obtain the attenuation index κ from $R_1$ and $R_2$ of Table 5, resulting in −0.2008. Similarly, the attenuation indices κ after 168 hours and after 30000 hours were obtained, resulting in almost the same values as shown in FIG. 9. Therefore, it was proved that the 24-hour measurement was enough to obtain almost the same attenuation index κ as that obtained after the image was displayed for a long period of time.

This allowed the attenuation index of the emission gas rate of CO as a gas that is adsorbed to the Ba getter film inside the image display device to be obtained with high precision for a short period of time.

After the attenuation index κ of a CO gas was measured, the valve 109 was closed, and the valve 107 was then opened to activate the third ionization vacuum gauge 130 and the fourth ionization vacuum gauge 131. The total pressures inside the first gas chamber 122 and the second gas chamber 123 were measured by the third ionization vacuum gauge 130 and the fourth ionization vacuum gauge 131, respectively. After the pressure became stable, the valves 107 and 134 were closed, and the valve of the gas bomb 132 filled with 99.99%-purity CO was opened. The valve 115 was then opened, and the mass flow controller 133 was opened to introduce CO into the second gas chamber 123 at $3.4\times10^{-4}$ $Pa\cdot m^3/sec$. After approximately 30 minutes elapsed while maintaining this state, the pressures inside the third ionization vacuum gauge 130 and the fourth ionization vacuum gauge 131 became stable. After the pressures were stabilized, the valve 135 was closed, and as soon as the valve 107 was opened, the measurement for the pressure $P_3$ of the third ionization vacuum gauge 130 and the pressure $P_4$ of the fourth ionization vacuum gauge 131 was started. The pressures $P_4$ and $P_3$ at the start of measurement were $1\times10^{-1}$ Pa and $5.9\times10^{-2}$ Pa, respectively. The time that was taken until the pressures $P_4$ and $P_3$ became almost the same, was 18 hours.

After the measurement, the valves 107 and 115 and the mass flow controller 133 were closed. Then, the valves 134 and 135 were opened to exhaust CO.

Figure 10:
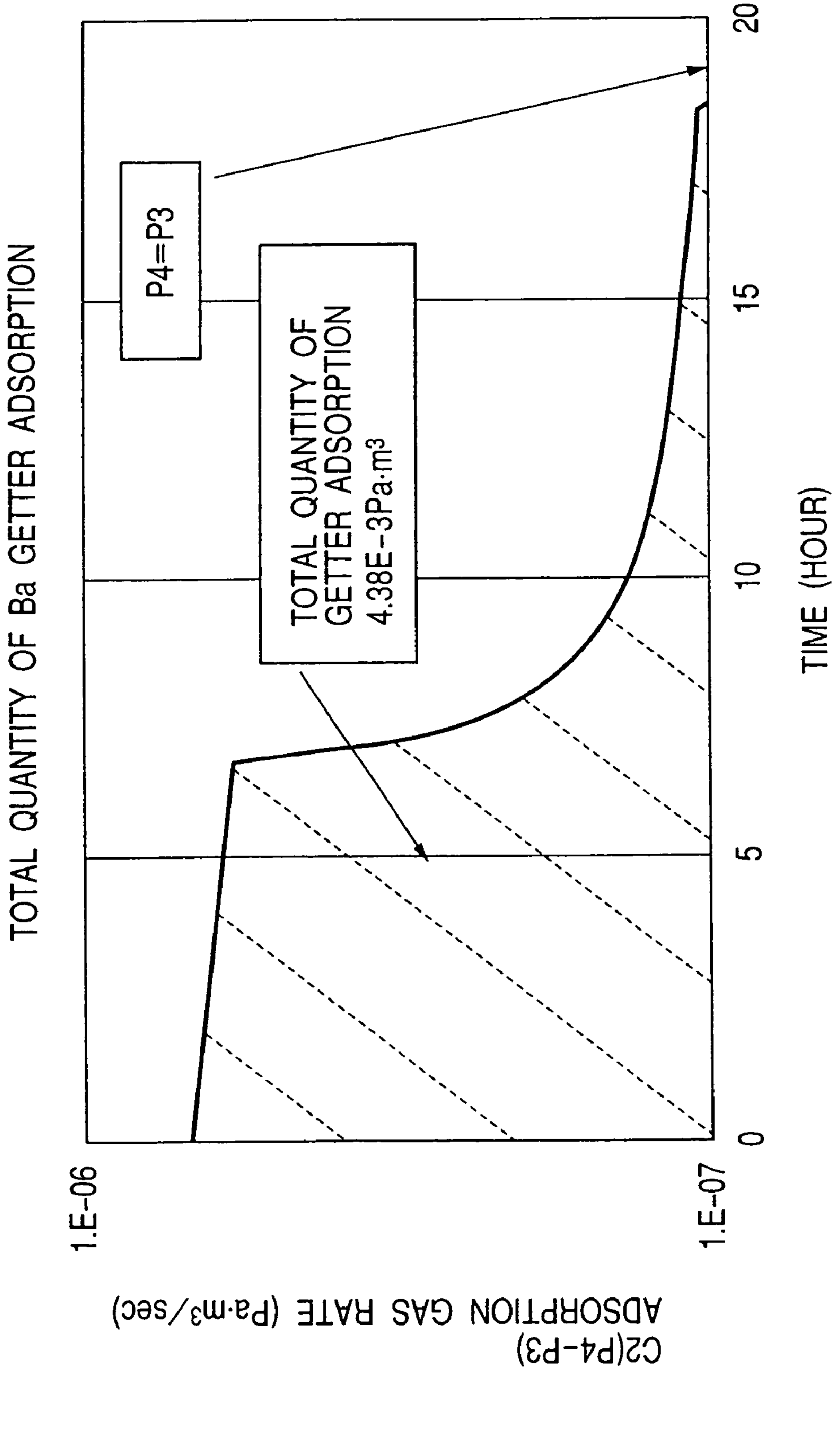
FIG. 10 is a correlation diagram between a time and a Ba getter adsorption gas rate of CO in an image display device according to the present invention.

FIG. 10 shows a relationship between a time and an adsorption gas rate of CO. The formula (2) was used to calculate the total gas amount of CO adsorbed to the Ba getter film, resulting in $W=4.87\times10^{-3}$ $Pa\cdot m^3$. (Considering that an area of the Ba getter is 90% of the image display panel,) the formula (4) was used to calculate $T_{end}$ based on the obtained total gas amount W of CO adsorbed to the Ba getter film and the emission gas rate attenuation index $\kappa$ of CO, with the result that $T_{end}$ was 40887 hours.

An image was displayed in the image display device used in Example 1 under the same conditions, and the luminance was measured using the luminance meter 801. The initial luminance was 600 $cd/m^2$. The elapsed time until the luminance of the image display device became half was measured, resulting in 41000 hours. At the same time, the gas rate of CO was measured. As a result, after 40500 hours, an increase in gas rate was observed. This is because the Ba getter film did not adsorb the CO gas any longer.

EXAMPLE 3

In Example 3, an Ar gas instead of CO was introduced to the apparatus in the same manner as in Example 2 except that the image display panel 101 was the same as that of Example 1. The purity of the Ar gas to be used was 99.9999%. Before introducing the Ar gas, the valve 110 was closed and the valve 109 was opened. When the pressure of the first ionization vacuum gauge 126 became $10^{-6}$ Pa, the valve 107 was closed. When the partial pressure of the gas was measured by the first mass spectrometer 127, the main gas was Ar, and the partial pressure of Ar was approximately $10^{-6}$ Pa. The background before this measurement, that is, before the Ar gas was introduced had been $2.5\times10^{-11}$ Pa.

Next, an image was displayed in the image display device 100 under the same conditions as in Example 1. The initial current value was 10 μA per unit device, and a measurement was performed as to how much current is maintained comparing with the current value after 24 hours. The similar measurement was performed in the case of the Ar gas pressures of $10^{-5}$ Pa and $10^{-4}$ Pa. The measurement results are shown in Table 6. Note that as a reference, a retention at the time when the Ar gas was not introduced is also shown.

TABLE 6

Ar gas pressure and retention of current value Ie

| Ar gas pressure (Pa) | Initial current value (μA) | Current value after 24 hours (μA) | Retention (%) |
|---|---|---|---|
| Ref | 10 | 9.94 | 99.4 |
| $10^{-6}$ | 10 | 9.93 | 99.3 |
| $10^{-5}$ | 10 | 9.05 | 90.5 |
| $10^{-4}$ | 10 | 8.01 | 80.1 |

When the Ar gas pressure became larger than $10^{-5}$ Pa, the retention became small. From the pressure around $10^{-5}$ Pa, influences of the Ar gas pressure on the surface conduction electron-emitting device as the electron source were observed. With regard to the gasses other than Ar, the evaluation of influences of the gases on the electron source can be performed similarly with high precision by a simple method.

According to the embodiments of the present invention, the sealed container, the manufacturing method therefor, the gas measuring method, and the gas measuring apparatus for implementing the gas measuring method are used to produce the following effects.

1. The image display device according to the present invention is seal-bonded in a vacuum in a state where the exhaust pipe having the breakable vacuum isolating member is connected to the sealed container at the time of manufacturing the sealed container. Accordingly, it becomes possible to perform the gas measurement for the emission gas rate or the like while maintaining the vacuum atmosphere inside the image display device.

Further, the exhaust pipe having the vacuum isolating member for connecting to the measuring apparatus is previously provided to the plate. Accordingly, the degasification can be sufficiently performed on the display device, the degasification from the member composing the display device can be suppressed to a minimum, and the emission gas rate at the time when an image is displayed in the image display device can be accurately measured.

Further, there is no trouble such as a leak or a damage which occurs when the image display device that has become a sealed container is formed with a hole later and attached with the exhaust pipe for measurement. In addition, glass fragments generated at the time of puncturing the glass are kept from being scattered inside the image display device, thereby suppressing discharge due to foreign matters such as glass fragments when displaying an image.

2. If necessary, the exhaust pipe is installed on the side of the plate to which the phosphor and the getter are formed, whereby the measurement can be performed without influencing the electron radiation from the electron source.

If the bellows are provided to the exhaust pipe having the breakable vacuum isolating member on the side to be connected to the plate as necessary, the exhaust pipe can be bent, facilitating the handling at the steps following the attaching of the exhaust pipe. In addition, after attaching the exhaust pipe having the breakable vacuum isolating member to the gas measuring apparatus, the bellows can absorb a thermal strain, a mechanical impact force, or the like, thereby preventing the exhaust pipe from being damaged.

If the total pressure before and after the orifice having a known conductance and provided to the measuring chambers or the partial pressure of each type of gas is measured as necessary, the conductance value of the orifices can be used to quantitatively evaluate the emission gas rate of each type of gas at the time of image display in the image display device. In addition, if the emission gas rate is measured as the emission gas rate per unit current value, the emission gas rate can be quantitatively evaluated as the emission gas rate that is not influenced by the level of the current amount for electron radiation from the electron source. If the emission gas rate is measured when the entire image area is not displayed but partial area is displayed, the emission gas rate at the time of displaying the entire image area can be predicted.

Also, in the case of measuring the partial pressure of each type of gas, the mass spectrometers are respectively provided as necessary to the two measuring chambers divided by the orifice. Therefore, the emission gas rates of the types of gases having the same molecular weight (mass number) such as CO and $N_2$ can be easily separated by solving the simultaneous equations based on a relational expression between the pressure and a peak intensity by use of a cracking pattern. Thus, the measurement of the emission gas rate of each type of gas becomes possible. Accordingly, if the emission gas rate is measured in one image display device, the emission gas rate in another image display device can be easily predicted.

Further, the emission gas rate of each type of gas can be accurately grasped. Accordingly, the attenuation index of the adsorption gas rate of the getter adsorption gas used for the measurement of the getter lifetime described later can be accurately calculated.

If the total pressure before and after the orifice having a known conductance and provided to the gas chamber is measured as necessary, the conductance value of the orifice can be used to quantitatively evaluate the gas rate of the introduced gas.

Further, by introducing the getter adsorption gas from the gas chamber as necessary, a constant amount of gas can be supplied to the image display device at a fixed rate. Accordingly, the total adsorption gas amount of the getter can be quantitatively evaluated with high precision.

Since each type of gas can be introduced in a constant amount at a fixed rate, an arbitrary gas is introduced as necessary to display an image in the image display device, thereby making it possible to accurately evaluate the influences of the type of gas on the electron-emitting characteristics of the electron source.

If the region to which the getter is not formed is provided as necessary to part of the plate including the phosphor and the getter, by measuring the emission gas rate of the getter adsorption gas in the region to which the getter is not formed at the time of displaying an image in the region for a short period of time, the attenuation index of the emission gas rate of the getter adsorption gas can be obtained. Next, by measuring the total adsorption gas amount of the getter according to introduction of the getter adsorption gas, the relational expression between the attenuation index of the emission gas rate of the getter adsorption gas and the total adsorption gas amount of the getter is solved. Accordingly, the getter lifetime can be easily calculated, and the life of the sealed container for the image display device can be easily predicted with high precision in a short period of time.

Further, if barium or a barium alloy is used as the getter and CO is used as the getter adsorption gas as necessary, the lifetime of the getter inside the image display device can be measured with high precision, and the life of the image display device can be accurately predicted.

What is claimed is:

1. A gas measuring method of performing a gas measurement inside a sealed container provided with a pair of plates and an exhaust pipe having a breakable vacuum isolating member on at least one of the plates, said method comprising the steps of connecting the sealed container to a gas measuring apparatus through the exhaust pipe, and breaking the breakable vacuum isolating member.

2. A gas measuring method according to claim 1, wherein: the exhaust pipe is installed to be directed downward; and the breakable vacuum isolating member is broken.

3. A gas measuring apparatus for implementing the gas measuring method according to claim 1.

4. A gas measuring apparatus according to claim 3, comprising:

a first gas measuring means including a measuring chamber in which a small hole of a conductance is formed as an orifice in a portion between the sealed container and a main vacuum pump, and at least pressure measuring means are installed on an upstream side and a downstream side of the small hole;

a second gas measuring means including a gas chamber in which a small hole of a conductance is formed as an orifice in a portion between the sealed container and a vacuum pump, and at least pressure measuring means are installed on an upstream side and a downstream side of the small hole, and which is provided with gas supplying means from the downstream side;

a breaking member that has a forward end for breaking the breakable vacuum isolating member; and a luminance meter to measure a luminance at a time of driving the sealed container.

* * * * *